United States Patent [19]

Van Arman et al.

[11] 4,268,945
[45] May 26, 1981

[54] METHOD OF ASSEMBLYING A SEALED STRUCTURE

[75] Inventors: William L. Van Arman, Niles, Mich.; Russell A. Kambs, Michigan City, Ind.; Steven G. Ivankovics, South Bend, Ind.; Frederick W. Hansen, South Bend, Ind.; Thomas M. Julow, South Bend, Ind.

[73] Assignee: The Bendix Corporation, Southfield, Mich.

[21] Appl. No.: 45,713

[22] Filed: Jun. 5, 1979

[51] Int. Cl.³ .................................. B23Q 17/00
[52] U.S. Cl. ...................................... 29/407; 29/404; 29/156.4 R; 73/46; 73/49.3
[58] Field of Search ................ 29/404, 407, 454, 722, 29/156.4 R, DIG. 44; 73/45.3, 46, 49.2, 49.3, 49.7, 49.8

[56] References Cited

U.S. PATENT DOCUMENTS

| | | | |
|---|---|---|---|
| 2,863,316 | 12/1958 | Abplanalp | 73/46 |
| 3,158,930 | 12/1964 | Wesstrom et al. | 29/156.4 R |
| 3,252,916 | 7/1944 | Schrader | 73/45.3 |

Primary Examiner—Lowell A. Larson
Attorney, Agent, or Firm—Leo H. McCormick, Jr.; Ken C. Decker

[57] ABSTRACT

A method of connecting a first shell to a second shell to establish a unitary sealed structure. A bead of a diaphragm assembly is connected to a first peripheral surface on the first shell to establish a first sealing surface and to define a first chamber between the diaphragm assembly and the first shell. A spring attached to the diaphragm assembly engages the second shell. A force applied to the second shell compresses the spring to bring a second peripheral surface thereon into engagement with the bead on the diaphragm to establish a second sealing surface and define a second chamber between the diaphragm assembly and the second shell. A vacuum evacuates air from the first and second chambers to establish a pressure differential between the first and second chambers and the surrounding environment. This pressure differential acts on the first and second shells to urge the first and second peripheral surfaces against the diaphragm to establish a unitary structure. Thereafter, the force applied to hold the first and second shells together is removed and the relationship between the first and second sealing surfaces is observed for a fixed time period. Should air from the surrounding environment enter into either the first or second chamber, the pressure differential is sufficiently reduced to allow the spring to separate the first and second shells to indicate a nonconformity between the first and second shells and the diaphragm. If the first and second shells remain together during the fixed time period, the first and second peripheral surfaces are thereafter crimped together to establish the unitary sealed structure.

19 Claims, 33 Drawing Figures

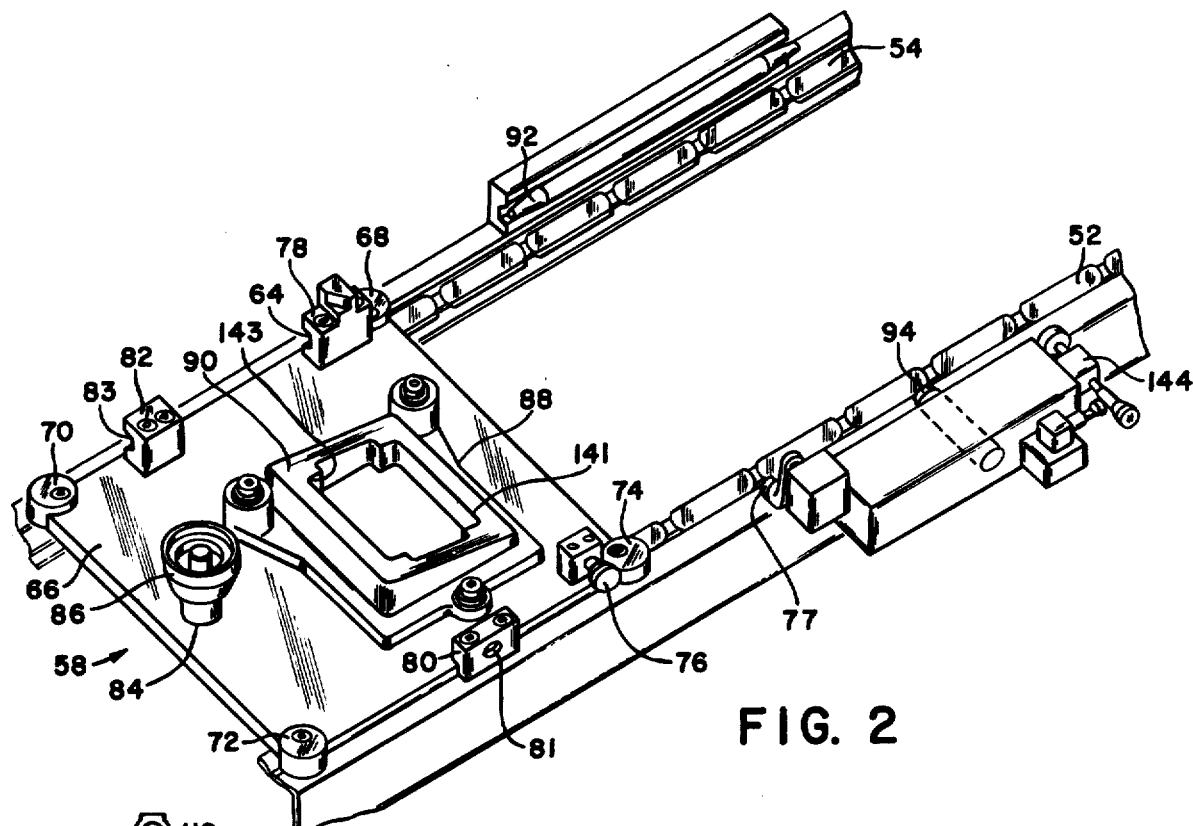
FIG. 2
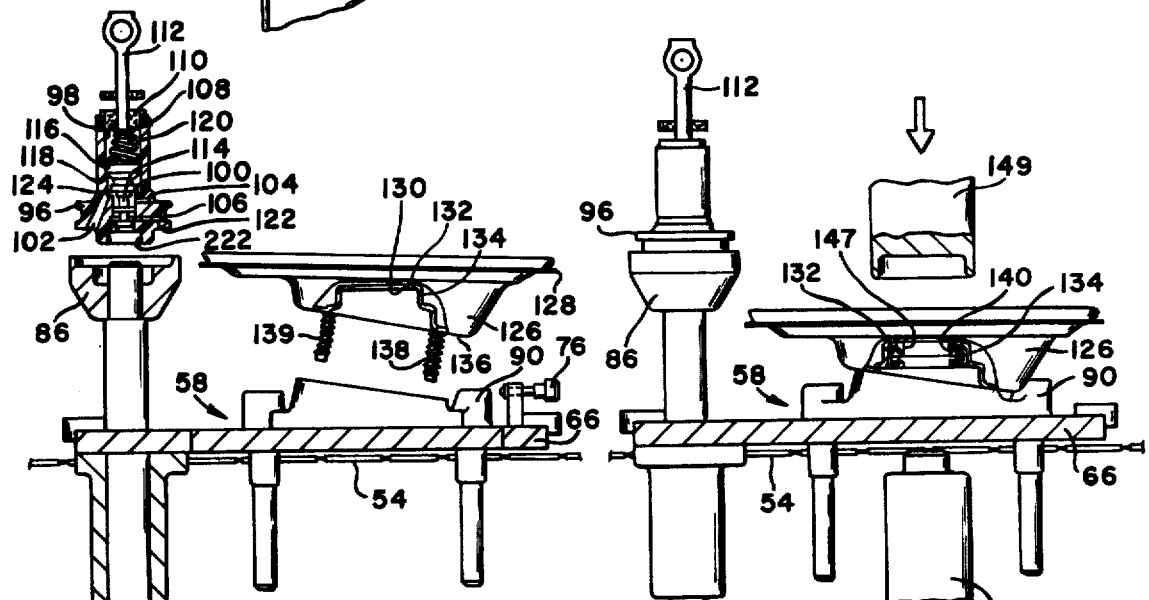
FIG. 3
FIG. 4

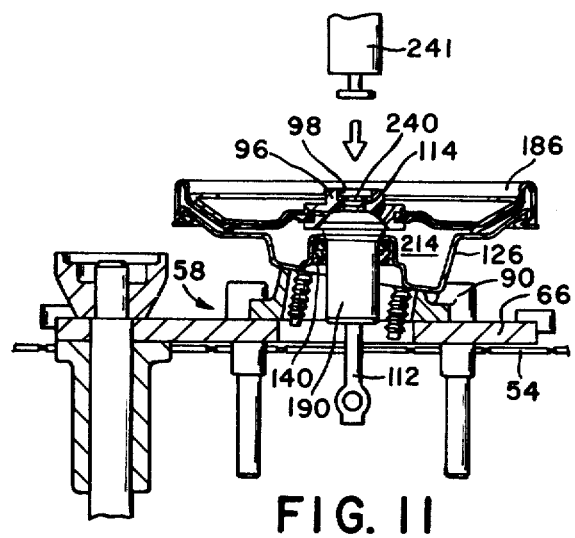
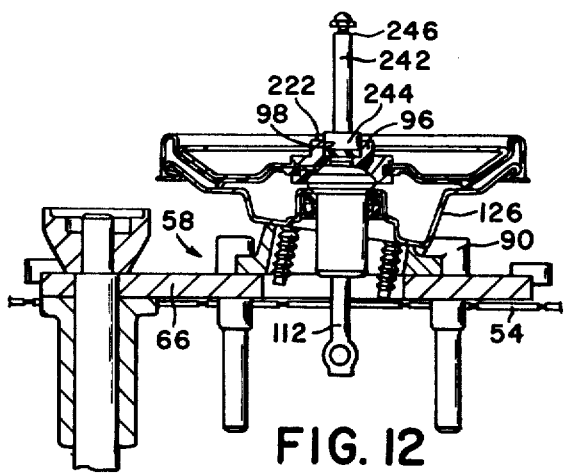
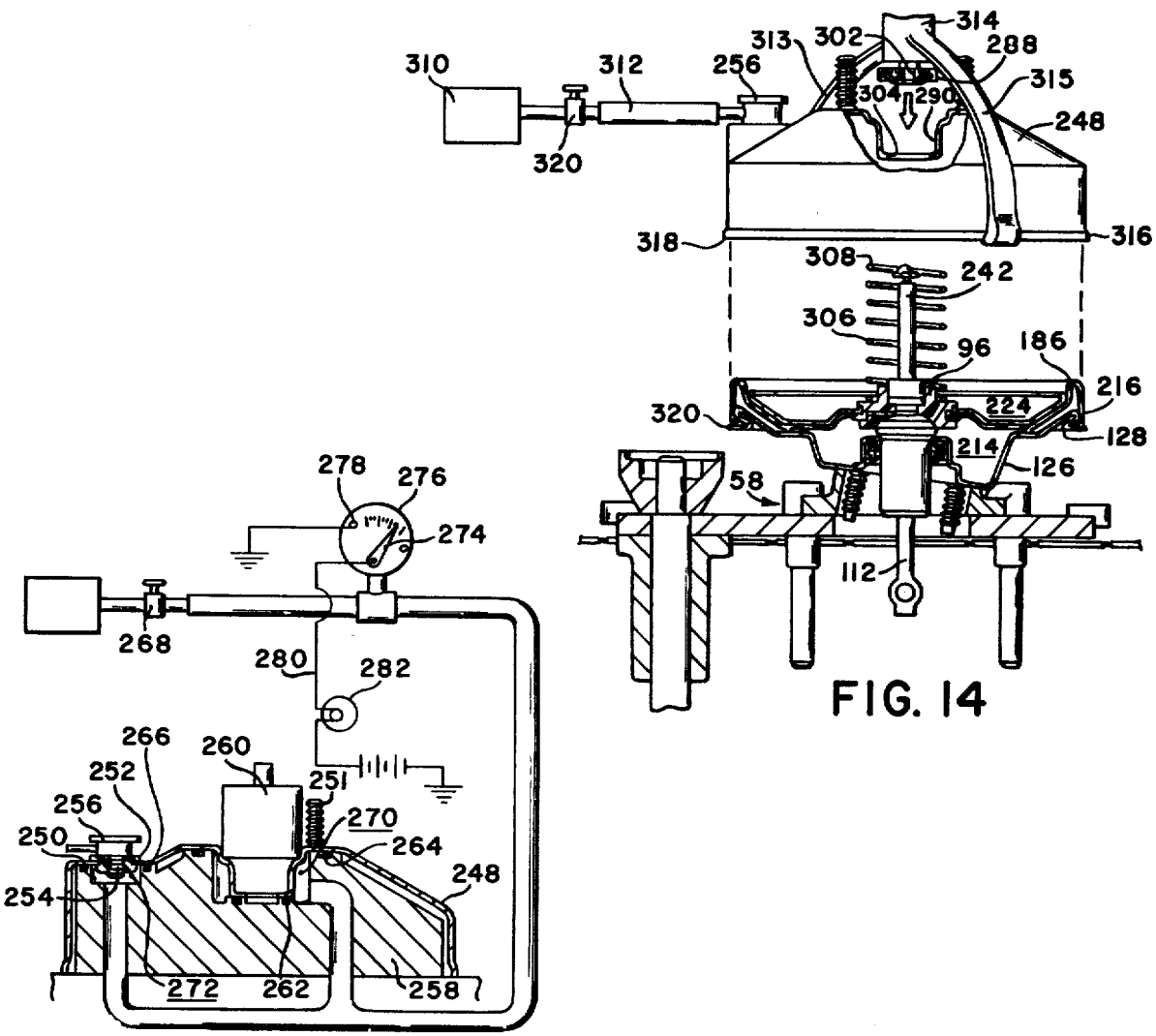
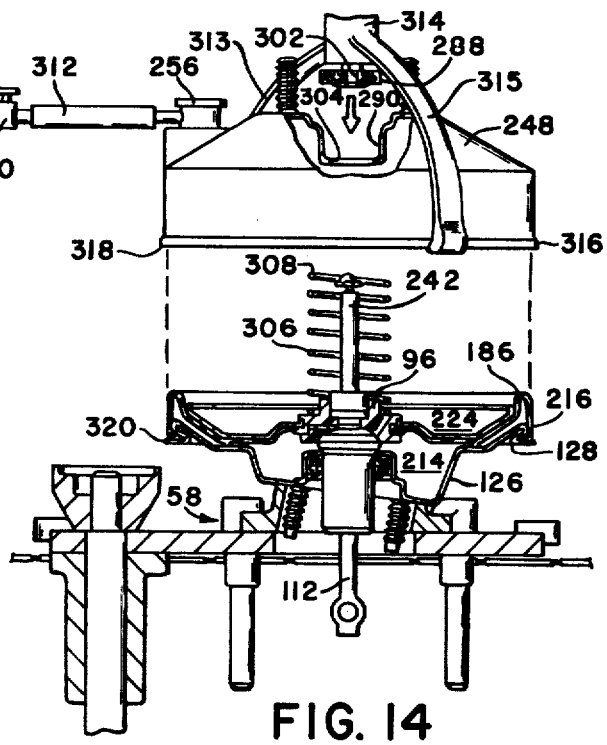
FIG. 11
FIG. 12
FIG. 13
FIG. 14

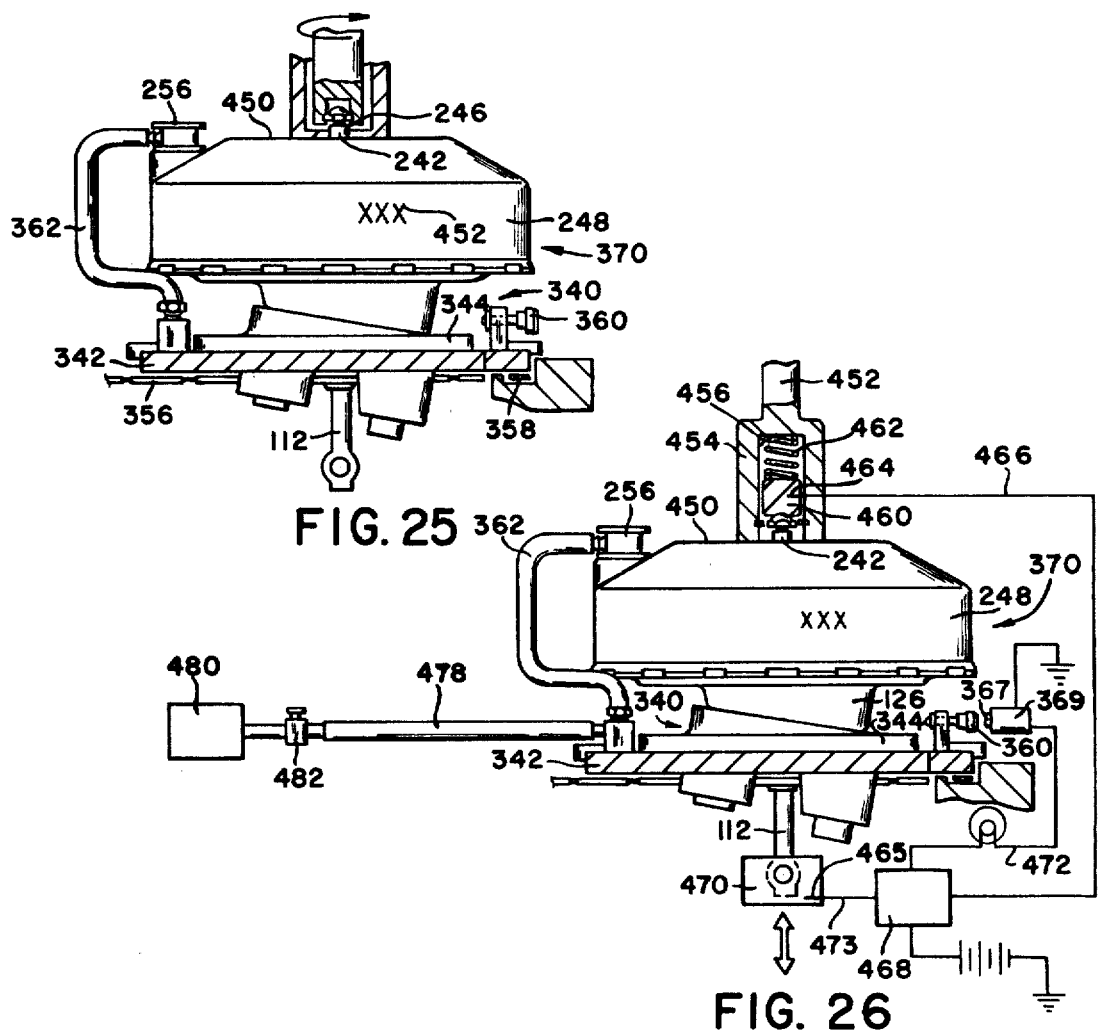
FIG. 25
FIG. 26
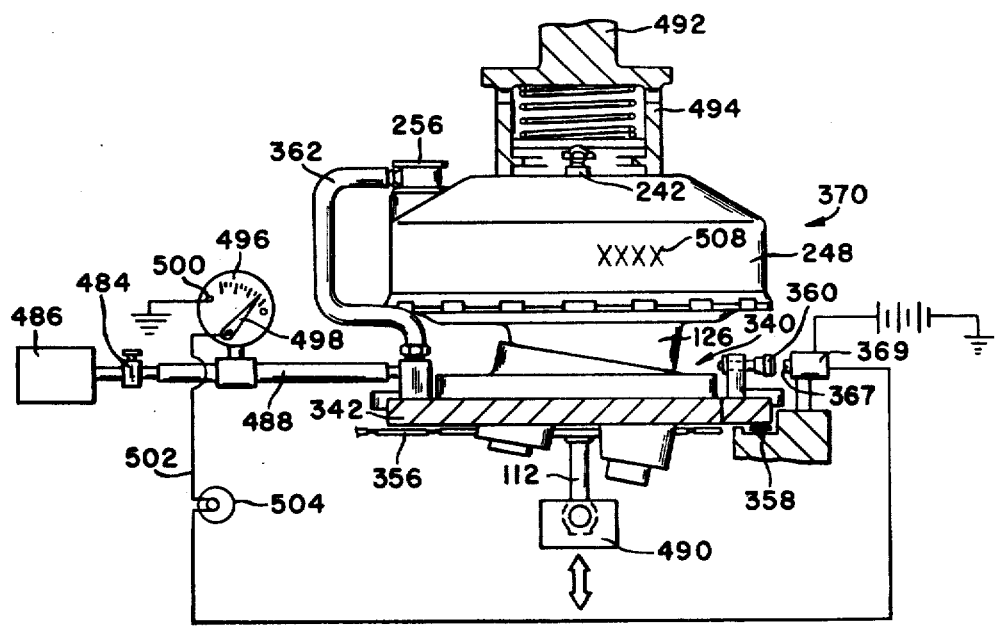
FIG. 27

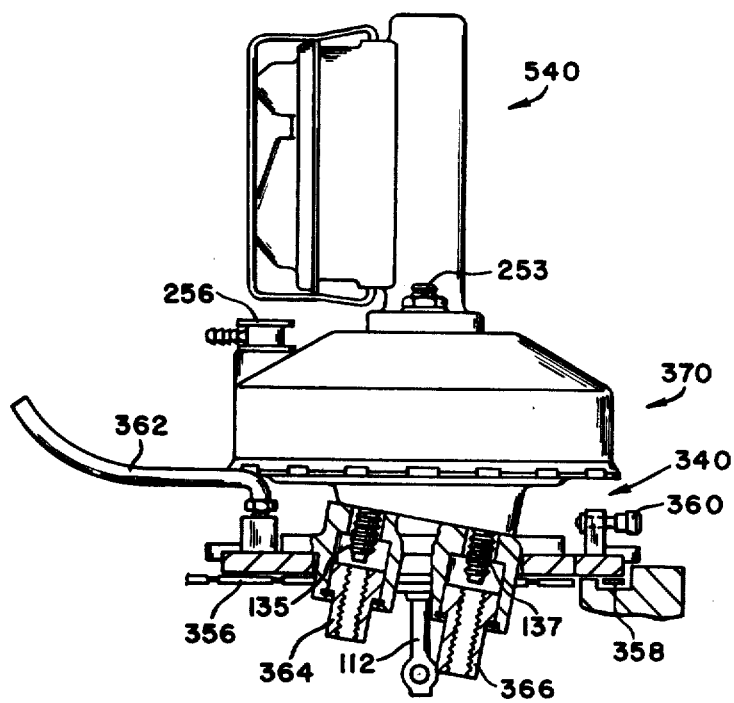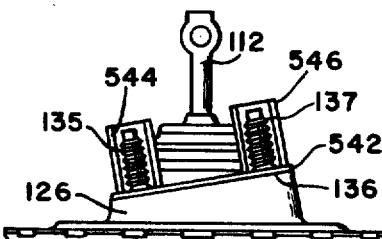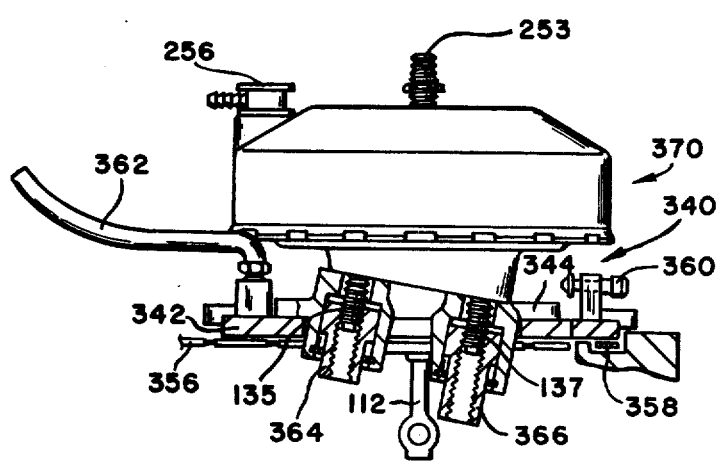

METHOD OF ASSEMBLYING A SEALED STRUCTURE

BACKGROUND OF THE INVENTION

This invention relates to a method of manufacturing a fluid pressure servomotor having a diaphragm assembly which separates the interior of a first shell from the interior of a second shell to define first and second chambers. The peripheral surface of the diaphragm assembly is held between the first and second shells by a connection to form a unitary sealed structure. Thereafter, air is evacuated from the first and second chambers to vacuum suspend the diaphragm assembly and allow a return spring to hold the diaphragm assembly against the first shell. In response to an input force applied through an input push rod to the diaphragm assembly, fluid communication between the first and second chambers is interrupted and air is allowed to enter the first chamber to create a corresponding pressure differential. This corresponding pressure differential acts on the diaphragm assembly to provide an output member that extends through the second shell with an output force.

In order to assure that the pressure differential that is developed across the diaphragm assembly is not reduced through the communication of air by way of a leak path through a sealing surface in the unitary structure, U.S. Pat. No. 3,158,930 discloses a method of manufacturing a servomotor wherein a compressive force is continually maintained on the peripheral surface of the diaphragm since that sealing surface possesses the largest surface area and thus the greatest leak path potential. During assembly of the servomotor disclosed in U.S. Pat. No. 3,158,930, the compressive force is applied to the first and second shells causing the peripheral surface of the diaphragm to be compressed. Thereafter, a lancing operation forms a radial clip in one shell which engages a lip of the other shell to affix the first and second shells together. When the compressive force is removed, the internal resiliency of the diaphragm acts on the first and second shells to form a sealed surface that prevents the communication of air into the first and second chambers. Unfortunately during the assembly of mass produced components, the first and second shells do not always exactly match. If the dimensional tolerances of the first and second shells approach opposite manufacturing limits, it is possible that a leak path may develop and allow air to be communicated to the first and second chambers since the expansion of the diaphragm to its original shape may not be sufficient to develop a seal between the peripheral surfaces of the first and second shells. Later, when air is evacuated from the first and second chambers, air flow through the leak path reduces the effective pressure differential as measured by the output force of the output push rod. Unfortunately since the first and second shells have been lanced together, if an attempt is made to salvage the components that make up the servomotor, the shells and diaphragm are often destroyed even though the non-conformity of only one component alone resulted in the leak path. Thus, corrective action to ascertain which component does not confirm to the manufacturing specification is often time consuming since additional damage can be caused by the salvage operation.

SUMMARY OF THE INVENTION

We have devised a method of manufacturing a fluid pressure differential operated servomotor wherein the sealing surfaces of the various components contained therein are sequentially analyzed under simulated operating conditions for potential leak paths before the external shell members are lanced together.

In this method, the sealing surfaces of a first shell are evaluated by a first test fixture for potential leak paths and either accepted or rejected. If the first shell is accepted, a diaphragm assembly which includes a hub, control valve and diaphragm is connected to the first shell and any additional sealing surfaces evaluated by a second test fixture for potential leak paths. If the second test fixture accepts the first shell and diaphragm assembly, a spring is attached to the diaphragm assembly and a second shell, which has been tested and accepted, is positioned on the spring. Thereafter, a compressive force of a third test fixture is applied to compress the spring and bring the first and second shells into engagement with the peripheral surface of the diaphragm assembly to establish first and second chambers within the first and second shells. Subsequently, air is evacuated from the first and second chambers to create as pressure differential across the first and second shells. This pressure differential force acts on the first and second shells to hold the first and second shells against the periphery of the diaphragm to establish a sealed housing. The compressive force is removed from the first and second shells. As long as the pressure differential force remains constant, the first and second shells remain as a unitary structure. However, should a leak path occur in any sealing surface, air from the surrounding environment enters into the first and second chambers to reduce the pressure differential sealing force. If the pressure differential sealing force is reduced to a predetermined level within a fixed time, the spring force is sufficient to separate the first and second shells. When such a separation occurs, the first and second shells and diaphragm assembly are routed to an inspection station where the leak path for air is identified and the component replaced.

If the first shell is found to be the non-conforming component, the sealing surface evaluation of the first and second test fixtures is repeated. However, if the second shell is the non-conforming component, the first shell, diaphragm assembly and spring are routed to the third test fixture where a different second shell is combined thereto. The compressive force is applied to the first shell and the different second shell to establish a unitary structure. Thereafter, air is evacuated from this unitary housing to produce the sealing pressure differential force across the first and second shells. If the pressure differential force is maintained across the first and second shells, the unitary structure is passed to a lancing fixture where compressive force is applied to the first and second shells and the peripheral surfaces of the first and second shells crimped to lock the first and shells together and produce a unitary sealed structure.

The unitary sealed structure is transported to a fourth test fixture where a source of vacuum is connected to the second chamber to evacuate the air from the first and second chambers to a predetermined pressure level. Thereafter, an input force is applied to an input push rod in the diaphragm assembly. This input force moves a valve plunger to interrupt communication of vacuum to the first chamber and open communication of air to the first chamber. With vacuum in the second chamber and air in the first chamber, an operational pressure differential is created across the diaphragm assembly. This operational pressure differential acts on the diaphragm assembly to produce an output force that is transmitted through an output push rod.

The reaction of the operational output force is carried through the crimped connection between the first and second shells. Thereafter, the output force from the output push rod is measured with the theoretical output force derived from the input force and the pressure differential acting on the diaphragm assembly to ascertain if a leak path could have developed in any sealing surface as a result of the lancing operation. If the output force matches the theoretical output force, the unitary sealed structure is thereafter identified as an acceptable servomotor.

It is therefore an object of this invention to provide a method of manufacturing a pressure differential operated servomotor wherein the sealing surfaces of the components contained therein are checked for leak paths during the sequential assembly thereof.

It is another object of this invention to provide a method of evaluating a seal created between the peripheral surfaces of first and second shells and a diaphragm assembly by evacuating air from the first and second shells to establish a pressure differential between the interior of the first and second shells and air in the environment surrounding the exterior of the first and second shells. This sealing pressure differential acts on the first and second shells to establish a unitary structure. As long as the sealing surface prevents air from being communicated to the interior of the first and second shells, the sealing pressure differential holds the first and second shells. However, should a leak path develop in the sealing surface, air enters the first and second chambers and causes a reduction in the pressure differential which eventually permits the first and second shells to separate. Such separation provides an indication of the nonconformity between the sealing surfaces of the components and as such, this particular combination of components should be rejected as not meeting the quality control standards for an acceptable pressure differential operated servomotor.

It is another object of this invention to provide a method of sequentially evaluating sealing surfaces on individual components that make up a sealed unitary structure.

It is a particular advantage of this invention to provide a method of sequentially evaluating the sealing surfaces of a first shell, a diaphragm assembly, a control valve and a second shell as they are combined into a unitary structure.

These and other objects should be apparent from reading this specification while viewing the drawings.

BRIEF DESCRIPTION OF THE DRAWINGS

FIG. 2 is a prospective view of a pallet for transporting the components that make up the unitary structure along the manufacturing assembly line shown in FIG. 1;

FIG. 3 is a view taken along line 3—3 of FIG. 1 illustrating the manufacturing operation at Station A;

FIG. 4 is a view taken along line 4—4 of FIG. 1 illustrating the manufacturing operation at Station B;

FIG. 11 is a view taken along line 11—11 of FIG. 1 illustrating the manufacturing operation at Station I;

FIG. 12 is a view taken along line 12—12 of FIG. 1 illustrating the manufacturing operation at Station J;

FIG. 13 is a view taken along line 13—13 of FIG. 1 illustrating the manufacturing operation at Station K;

FIG. 14 is a view taken along line 14—14 of FIG. 1 illustrating the manufacturing operation at Station L;

FIG. 25 is a view taken along line 25—25 of FIG. 20 illustrating a test procedure at station U;

FIG. 26 is a view taken along line 26—26 of FIG. 20 illustrating a test procedure at station V;

FIG. 27 is a view taken along line 27—27 of FIG. 20 illustrating a test procedure at station W;

FIG. 31 is a view taken along line 31—31 of FIG. 20 illustrating the procedure for removing an accepted unitary structure and other member from a pallet at station $\psi$;

FIG. 32 is a view taken along line 32—32 of FIG. 20 illustrating the transportation of an acceptable unitary structure and other members from the testing line to a storage area; and FIG. 33 is a view taken along line 33—33 of FIG. 20 illustrating a manufacturing procedure at station $\phi$ for removing an unacceptable unitary structure from a pallet.

DETAILED DESCRIPTION OF THE INVENTION

Figure 1:
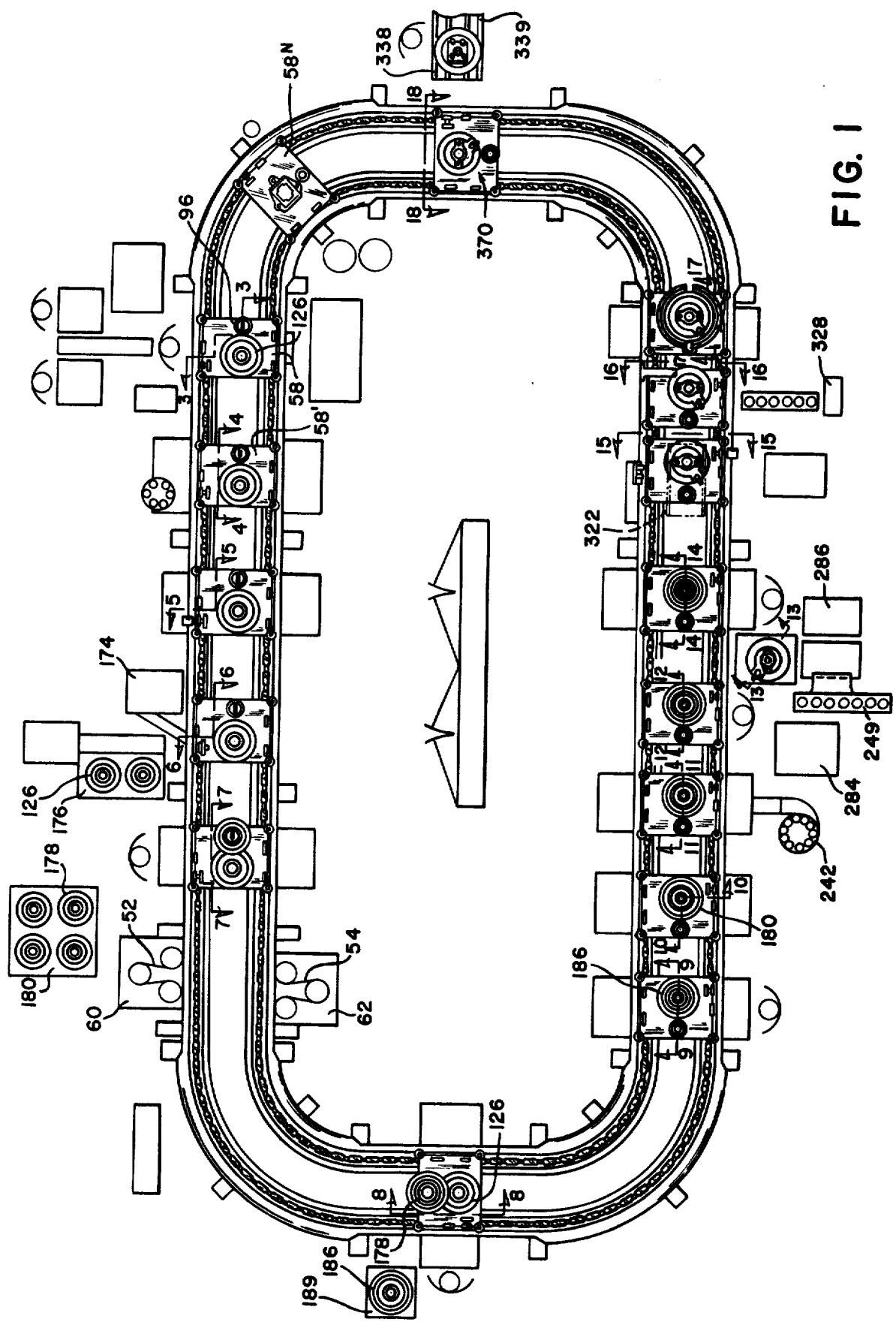
FIG. 1 is a plan view of an assembly line for manufacturing a unitary and sealed structure according to the principles of this invention.
Figure 18:
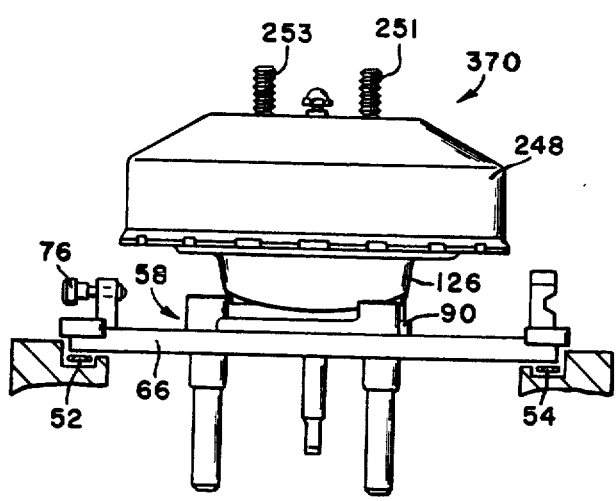
FIG. 18 is a view taken along line 18—18 of FIG. 1 illustrating the manufacturing operation at Station P.

The servomotor 370 shown in FIG. 18 was manufactured on the assembly line shown in FIG. 1. The sealing surfaces of the various components that make up the servomotor 370 were sequentially checked for leak paths during the assembly thereof.

The assembly line in FIG. 1 has first and second belts 52 and 54 that are driven by synchronized motors located in housings 60 and 62, respectively. Movement of belts 52 and 54 transport pallets 58, 58'. . .58$^N$ one of which is illustrated in FIG. 2 from station A through station P during the assembly of the components in servomotor 370. Since the sealing surface of each component in the servomotor is checked for compatibility with its corresponding mating component, only those components that pass inspection are used in the final assembly of, each servomotor 370. Thus each servomotor 370 which is removed from station P of FIG. 1 should be identical in physical dimension.

Figure 20:
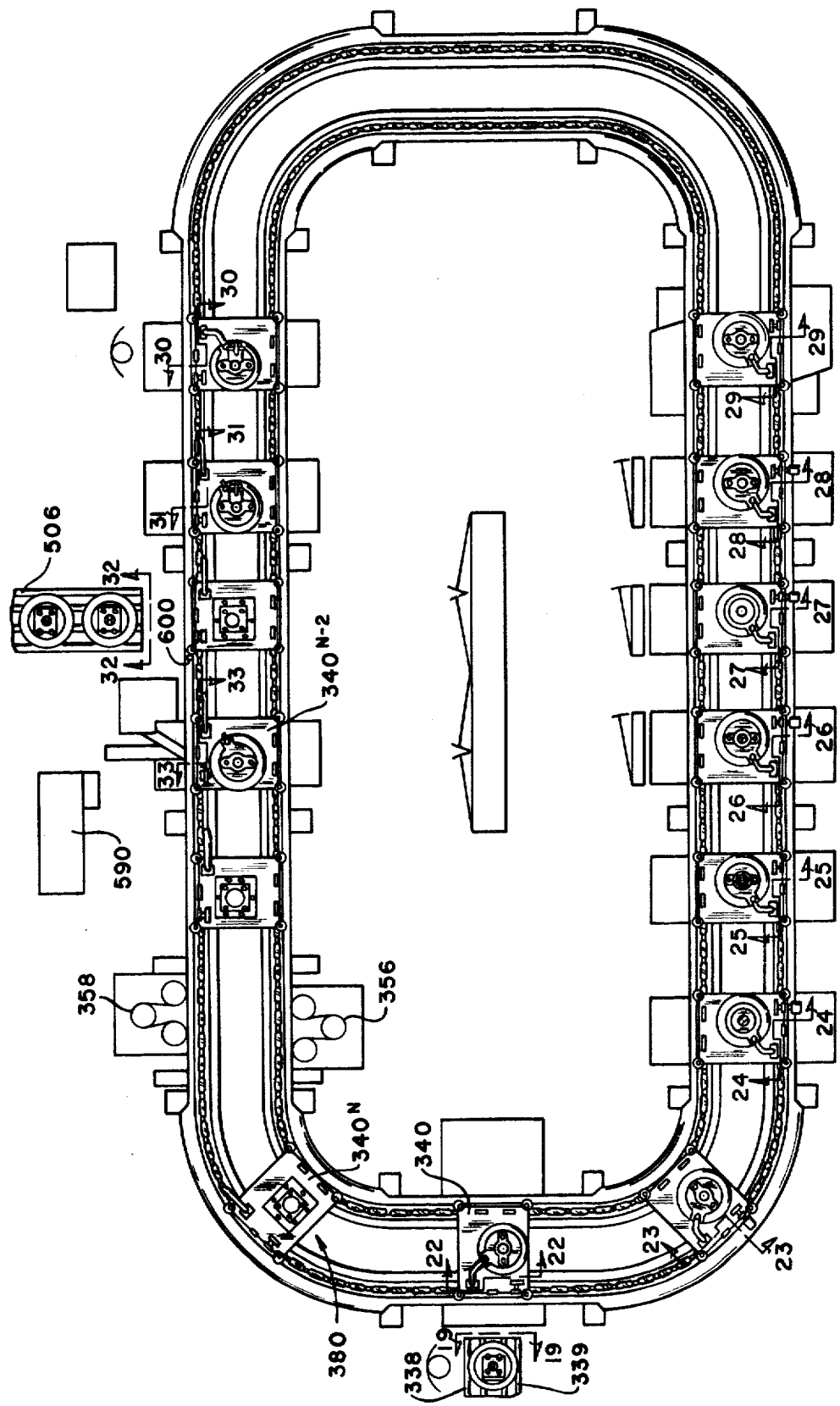
FIG. 20 is a plan view of a line for testing the operational characteristics of the unitary and sealed structure manufactured on the assembly line of FIG. 1.

Each servomotor 370 removed from assembly line station P of FIG. 1 is transported to a pallet 340, 340'. . . 340$^N$ on a testing line illustrated in FIG. 20. Each servomotor 370 in the testing line in FIG. 20 passes from station R through station Y where the operation is checked against a reference and calibrated in order to synchronize the operation thereof with a master cylinder to provide a brake actuator unit ready for shipping at station Ψ.

In more particular detail, the method of assembling a sealed structure of a pneumatically operated servomotor 370 starts at station A in FIG. 1.

An empty pallet 58$^N$ available for transporting the servomotor components from one station to another station is retained in storage adjacent to station A. Since each pallet 58 . . . 58$^N$ in the assembly line of FIG. 1 is identical, the detail shown in FIG. 2 applies to the entire number of pallets 58 . . . 58$^N$. Each pallet 58 has a base 66 to which rubber bumpers 68, 70, 72 and 74 are connected to the corners thereof, a pin arrangement 76, and a three point locking device 78, 80 and 82. Base 66 has a first opening 84 which receives a valve retaining fixture 86 and a second opening 88 which receives a shell retaining fixture 90.

When pallet 58 moves to a station, a guide 92 engages groove 64 on point member 78 at the same time a switch 77 senses the position of pin 76. If the pin 76 is in the operational accepted position, the switch 77 supplies the station with an operational signal. When guide 92 engages both grooves 64 and 83 on point members 78 and 82, a projection 94 is moved into engagement with recess 81 on point member 80 and base 66 is moved out of engagement with the drive belts 52 and 54. However, if the pin 76 is in a reject position, pallet 58 passes through the station without any further processing of the components.

When a pallet 58 moves into station A, as shown in FIG. 3, pin 76 is in the operational accepted position. Therefore, pallet 58 is held stationary until such time that the operation of station A is completed.

At station A, an operator manually installs a hub 96 in fixture 86 and a shell 126 on fixture 90. The contour on fixture 90 is such that the peripheral surface 128 of shell 126 is in a plane substantially parallel to base 66. The shell 126 has an axial opening 130 with a lip 132 connected to a sleeve 134 that projects inwardly from face 136. Sleeve 134 is in a plane substantially perpendicular to peripheral surface 128 while face 136 is in a plane that is slanted thereto. A series of bolts or studs 138 and 139 which are attached to the slanted surface 136 to facilitate installation of the resulting servomotor on the fire wall of a vehicle engage bushing 141 and surface 143 on fixture 90 to hold shell 126 on pallet 58.

The hub 96 has an axial bore 98 that extends therethrough. The hub 96 has a vacuum seat 100 which separates a first passage 102 from a second passage 104, and a keyway 106. Thereafter, an input push rod 112 having a poppet valve assembly 108 and a filter 110 attached thereto is lubricated and inserted into bore 98. When diaphragm retainer 116 positions the end of the poppet valve 108 on shoulder 118 on hub 96, an input force is applied to push rod 112 which compresses return spring 120 to allow the insertion of key 122 in keyway 106 to hold the poppet valve assembly 108 in the hub 96. Thereafter, the input force is removed, and the return spring 120 acts on the push rod 112 to urge plunger 114 against diaphragm seat 124 to seal bore 98 from atmospheric communication. In this position, flow communication freely occurs between passages 102 and 104 through bore 98.

When the poppet valve assembly 108 is installed in the hub 96, a switch is activated and pallet 58 is released from the three point locking device 78, 80 and 82 at station A. Thereafter, drive belts 52 and 54 engage base 66 and transport pallet 58 to station B illustrated in FIG. 4.

Figure 5:
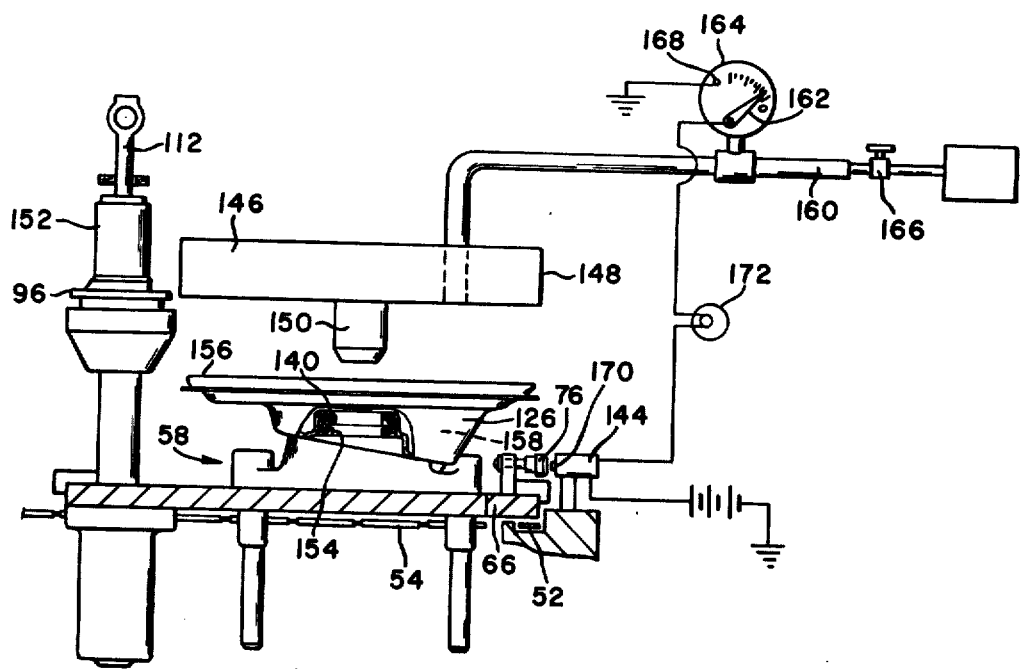
FIG. 5 is a view taken along line 5—5 of FIG. 1 illustrating the manufacturing operation at Station C.

At station B, a seal 140 of the type fully disclosed in U.S. Pat. No. 3,724,211 is inserted in sleeve 134. A press has a first member 149 which engages the shell 126 and a second member 145 which engages seal 140 to position face 147 on the seal 140 against lip 132 and establish a sealing surface between the seal 140 and sleeve 134. When the seal 140 is pressed into the shell 126, the pallet 58 is released from station B and transported to station C shown in FIG. 5 by continuously moving belts 52 and 54.

At station C, the operational switch 77 senses the position of the pin 76 to move base 66 out of engagement with drive belts 52 and 54 when the three point locking devices 78, 80 and 82 are aligned with guide 92 and projection or pin 94. In this position, pin 76 is aligned with a solenoid valve 144 that is operatively connected to test fixture 146 at station C.

Test fixture 146 has a cylindrical body 148 that has an annular projection 150 extending therefrom. The annular projection 150, which has a diameter equal to the diameter of surface 152 on hub 96, is brought into engagement with surface 154 on seal 140 to establish a sealing surface therebetween and the cylindrical body is brought into engagement with surface 156 on the periphery of shell 126 to establish a sealing therebetween for a chamber 158 defined between the interior of the shell 126 and the test fixture 146. Thereafter, air is evacuated from chamber 158 by a source of vacuum communicated through conduit 160. When the pressure level in chamber 158 is reduced to a predetermined value, as indicated by needle 162 on gage 164, valve 166 is closed. The pressure level in chamber 158 is monitored by gage 164 for a predetermined time interval. If the needle 162 on gage 164 remains substantially constant, shell 126 is accepted and pallet 58 is transmitted to station D shown in FIG. 6. However, should a leak path for air from the surrounding environment be present in the sealing surfaces between the test fixture 146, the shell 126 and seal 140, air from the surrounding environment is communicated into chamber 158 and the pressure level therein as measured by gage 164 changes. Gage 164 is calibrated such that any change in the pressure level within a preset time allows needle 162 to engage contact 168 and complete an electrical circuit for solenoid valve 144 and visual indicator 172. When electrical energy is communicated to solenoid valve 144, plunger 170 therein moves into engagement with pin 76 to indicate that the sealing surface on shell 126 and seal 140 are rejected and no further assembly should take place. Thereafter, the pallet 58 is released from the three point locking device 78, 80 and 82 at station C and transported to station D shown in FIG. 6 by drive belts 52 and 54.

Figure 6:
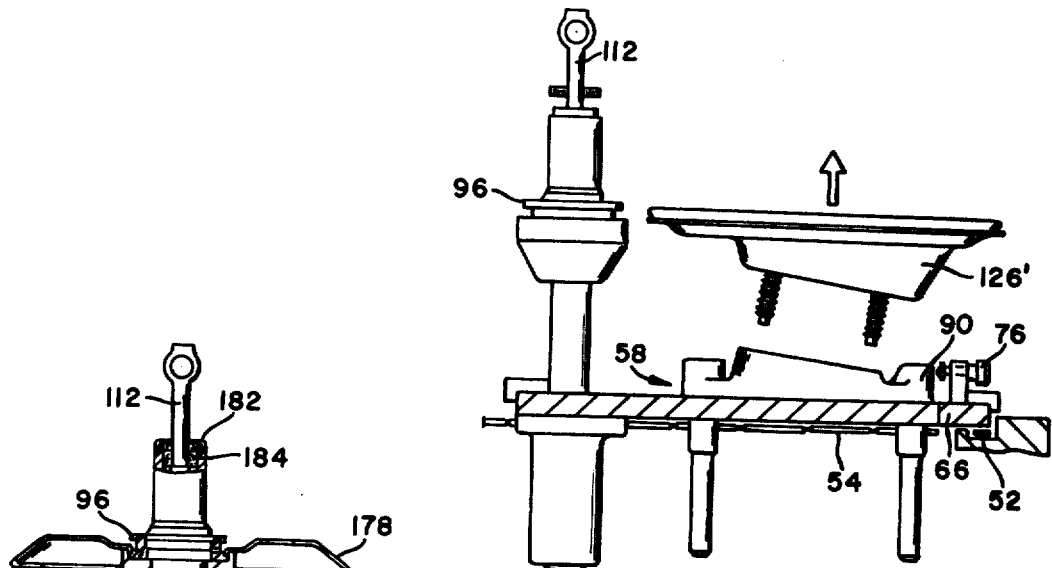
FIG. 6 is a view taken along line 6—6 of FIG. 1 illustrating the manufacturing operation at Station D.

When pallet 58 arrives at station D, switch 77 senses the position of pin 76. If the pin 76 is in the reject position as shown in FIG. 6, the switch activates the three point locking device 78, 80 and 82 to hold the pallet 58 in a stationary position as shown in FIG. 6. Thereafter, the rejected shell 126' is removed from the shell retaining fixture 90 and placed in a reject storage container 174 shown in FIG. 1. When the shell 126' is removed from the pallet 64, the operator resets the pin 76 and thereby releases the three point locking device to allow base 66 to contact belts 52 and 54 and transport pallet 58 to station E shown in FIG. 7. It should be noted that on acceptance of shell 126 at station C, pin 76 remains in the accept position and switch 77 at station D remains off to allow pallet 58 to pass directly to station E.

Figure 7:
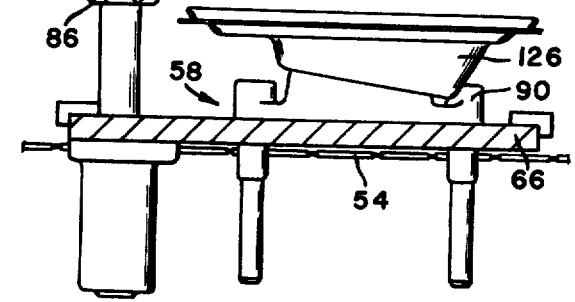
FIG. 7 is a view taken along line 7—7 of FIG. 1 illustrating the manufacturing operation at Station E.

At station E, operational switch 77 engages contact pin 76 to bring guide 92 and pin 94 into contact with the three point locking device 78, 80 and 82 and move base 66 off of drive belts 52 and 54 to hold pallet 58 in a stationary manner as shown in FIG. 7.

If the shell retainer 90 is empty, a new shell 126 which has already been accepted is obtained from a safety stock of accepted shells held in storage container 176 and placed on the retainer 90 in order that the steps of the assembly from station E-P can proceed.

Thereafter, a diaphragm backing plate 178 is removed from a storage supply container 180 and placed on hub 96. A filter retainer 182 is pressed onto the end 184 of the hub 96. After inspecting the relationship of the retainer 182 and hub 96 to make sure that the retainer 182 is seated, the operator activates a switch which releases the three point locking device 78, 80 and 82 and allow belts 52 and 54 to move pallet 58 to station F shown in FIG. 8.

Figure 8:
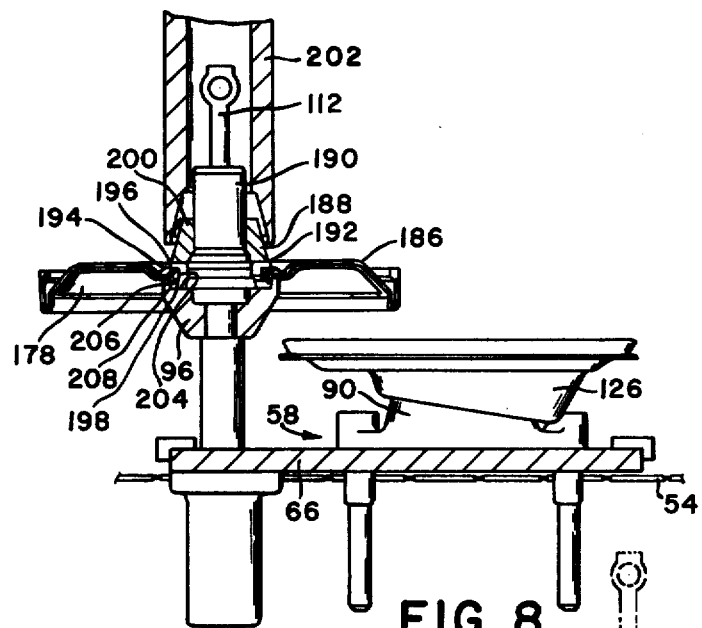
FIG. 8 is a view taken along line 8—8 of FIG. 1 illustrating the manufacturing operation at Station F.

As shown in FIG. 8, a diaphragm 186 is removed from storage 189 and affixed to the hub 96 in the following manner, which is similar to the process described in U.S. Pat. No. 3,897,718.

A conical shaped sleeve 188 placed on the cylindrical body 190 is brought into engagement with shoulder 192 on hub 96. The base 196 of the conical shaped sleeve 188 has a diameter substantially equal to the diameter 194 of the hub 96. A lubricant is applied to the interior bead 198 of the diaphragm 186 and the bead 198 placed on the apex 200 of the conical shaped sleeve 188. A fixture which has a cylindrical member 202 is brought into engagement with bead 198. The lubricant and the resiliency of the bead 198 allows the cylindrical member 202 to move the bead 198 toward the base 196 of the conical shaped sleeve 188. When the bead 198 reaches the base 196 of the conical sleeve 188, the cylindrical member 202 moves the bead 198 onto diameter 194 and into groove 204 to resiliently urge lip 206 on the backing plate 178 against ledge 208 of the wall 194 and to hold key 122 in slot 106.

Thereafter, the cylindrical member 202 is retracted and the conical shaped member 188 is removed from cylindrical body 190. Subsequently, the operational switch is activated to release the three point locking device 78, 80 and 82 and allow drive belts 52 and 54 to move pallet 58 to station G shown in FIG. 9.

Figure 9:
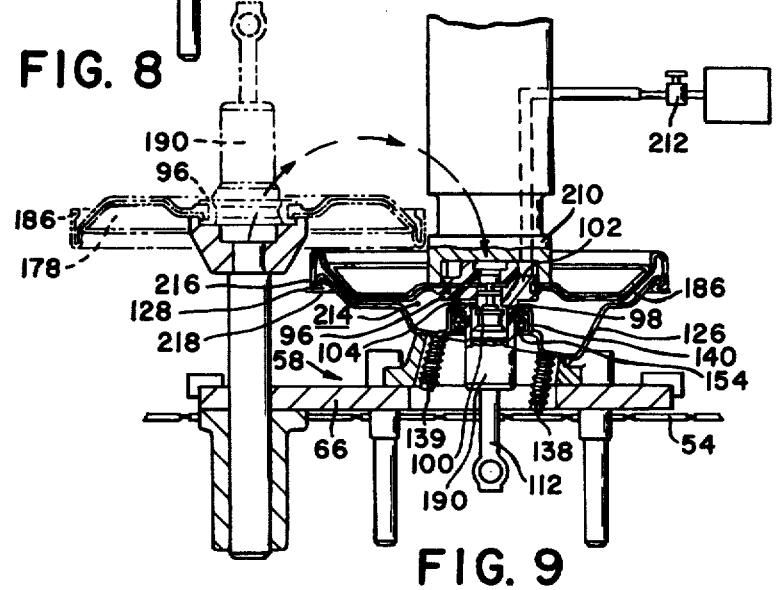
FIG. 9 is a view taken along line 9—9 of FIG. 1 illustrating the manufacturing operation at Station G.

At station G, the operational switch 77 senses the position of pin 76 and activates the three point locking device 78, 80 and 82 to move base 66 out of engagement with belt 54 as shown in FIG. 9.

The operator applies a lubricant to the exterior surface of the cylindrical body 190. Thereafter the cylindrical body 190 is inserted in seal 140 to establish sealing surface arrangement 154. A test fixture 210 which is connected to a source of pressurized air is brought into contact with diameter 194 of hub 96. On opening of valve 212, air under pressure passes through fixture 210 into passage 102, past seat 100, into bore 98, and through passage 104 to a chamber 214 formed between diaphragm 186 and shell 126. As the air under pressure passes into chamber 214, the peripheral bead 216 is expanded and seated in groove 218 on the peripheral surface 128 of shell 126 to establish a sealing surface. The position of bead 216 with respect to the peripheral surface 128 is visually observed by the operator and if the resulting sealing surface appears to be acceptable, a switch is actuated to release the three point locking device 78, 80 and 82 and allow drive belt 52 and 54 to transport pallet 58 to station H shown in FIG. 10.

Figure 10:
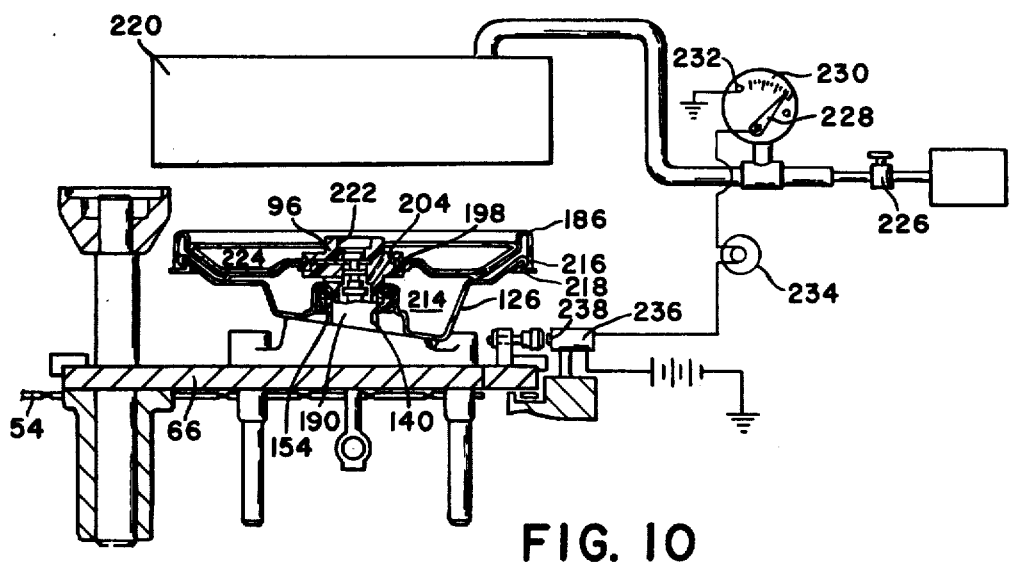
FIG. 10 is a view taken along line 10—10 of FIG. 1 illustrating the manufacturing operation at Station H.

As shown in FIG. 10, the sealing surface between bead 216 on diaphragm 186 and groove 218 on shell 126, and between bead 198 on diaphragm 186 and groove 204 on hub 96 and between cylindrical body 190 and face 154 on seal 140 are checked by test fixture 220 in the following manner.

Test fixture 220 is brought into engagement with bead 216 on diaphragm 186 and end 222 on hub 96 to define a chamber 224 between the diaphragm 186 and test fixture 220. A valve 226 is opened and air is evacuated from chambers 214 and 224 to lower the pressure therein with respect to air in the surrounding environment. When the pressure in chambers 214 and 224 reaches a predetermined level as measured by needle 228 on gage 230, valve 226 is closed.

If the pressure level in chambers 214 and 224 remains constant, needle 228 remains in a fixed position with respect to the indicia on gage 230 to thereby provide an indication that the sealing surfaces do not have any leak paths through which air from the surrounding environment is entering and changing the pressure level. However, should a leak path develop in any sealing surface during this test interval, the pressure level in chambers 214 and 224 rises and is reflected by a change in the position of needle 228 on gage 230. If the change in the pressure level is sufficient to effect the operation of a resulting servomotor, needle 228 engages contact 232 to close an electrical circuit between light 234 and solenoid valve 236. With the electrical circuit closed, electrical current flows to light 234 to provide the operator with a visual indication of the rejection of the components and in addition, plunger 238 on solenoid valve 236 moves pin 76 to mechanically indicate a rejection. Thereafter, the operator actuates a switch to release the three point locking device 78, 80 and 82 and allow belts 52 and 54 to transport pallet 58 to the next station I shown in FIG. 11.

If the operational sensor switch 77 at station I senses that pin 76 is in the reject position resulting from a failure to maintain a constant pressure level at station H for a predetermined time period, pallet 58 passes through station I and the remaining stations J-O without any further assembly.

However, if the pressure level as measured by test assembly 220 was maintained at station H, the sensor at station I activates the mechanism associated with the three point locking device 78, 80 and 82 to move base 66 off drive belts 52 and 54 as shown in FIG. 11. At station I, a rubber reaction disc 240 from supply container 242 is installed in bore 98 by fixture 241. The rubber reaction disc has a radial interference fit with the bore 98 to assure that communication of air between chamber 214 and the resulting chamber 224 does not take place through bore 98. The rubber reaction disc 240 cooperates with plunger 114 in the valve assembly 108 to provide the push rod with a feed back force corresponding to the resistance to movement of the hub 96. On installation of the rubber reaction disc 240, a switch releases the three point locking device 78, 80 and 82 and allow drive belts 52 and 54 to transport pallet 58 to station J shown in FIG. 12.

The operational switch 77 at station J senses the position of pin 76 and if the components on pallet 58 are acceptable as indicated by the position of pin 76, activates the mechanism associated with the three point locking device 78, 80 and 82 to move base 66 off drive belts 52 and 54 as shown in FIG. 12. The operator thereafter inserts the head 244 of an output push rod 242 in bore 98. Head 244 of push rod 242 has substantially the same diameter as bore 98 and moves with respect to hub 96 to provide reaction disc 240 with an input force corresponding to the resistance to movement of a device (a piston in a master cylinder) connected to the end 246 of the push rod 242. After connecting the push rod 242 to the hub 96, the operator operates a switch to release the three point locking device 78, 80 and 82 and allows drive belts 52 and 54 to transport pallet 64 to station L shown in FIG. 14.

The operator at station J also operates station K wherein a front shell 248 is tested to evaluate the surfaces thereon for potential leak paths as shown in FIG. 13.

A supply of front shells 248 are retained in a storage container 249 at station K. The operator removes a front shell 248 from storage and installs a grommet 250 in opening 252 of shell 248. A stem 254 of a check valve 256 is inserted into grommet 250 to seal opening 252 from the surrounding environment.

After the check valve 256 has been inserted into grommet 250, the shell is placed on test fixture 258 and a force applied to the outside of the shell 248 by press 260. Resilient seals 262, 264 and 266 on the test fixture engage the interior of the shell 248 to seal the stud connectors 251 only one is shown, the check valve 256, grommet 250 and opening 252 from the surrounding environment. Thereafter, valve 268 is opened and vacuum allowed to lower the pressure in areas 270 and 272 to a predetermined level as indicated by needle 274 on gage 276. The valve 268 is closed and the pressure level in areas 270 and 272 is observed for a period of time. If a leak path is present around the grommet 250, through the check valve 256 or stud connections 251, the pressure level in areas 270 and 272 changes. If this change occurs within a time period as set by the test, needle 274 engages contact 278 to close electrical circuit 280 and allow electrical current to operate a light 282 to inform an operator of an unacceptable shell 248 that should be rejected and placed in a discard scrap container 284.

If the needle 274 remains stationary for the test period, shell 248 is accepted and transmitted to a supply container 286. Supply container 286 is adjacent station L and is combined with the components on pallet 58 at station L shown in FIG. 14 in the following manner.

A spring 306 which surrounds push rod 242 is placed on hub 96. A seal 288 of the type disclosed in U.S. Pat. No. 3,158,930 is placed in recess 290 of an acceptable shell 248 received from the supply container 286 of station L. Thereafter shell 248 is placed in guide 315 of test fixture 314 and brought into engagement with the end 308 of the spring 306. Check valve 256 on shell 248 is connected to a source of vacuum 310 through hose 312. Thereafter, a force is applied to shell 248 by test fixture 314 to compress spring 306 and move shell 248 toward shell 126. As shell 248 is moved, push rod 242 passes through and engages surface 302 of seal 288 to seal opening 304. As shell 248 approaches shell 126, annular peripheral surface 316 engages lip 216 on diaphragm 186 to establish sealing surface therewith in addition to defining limits for chamber 224. When edge 318 on peripheral surface 316 of shell 248 engages tab 320 on peripheral surface 128 of shell 126, the movement of press 314 terminates. Thereafter, valve 320 is opened and vacuum from source 310 evacuates air from chambers 214 and 224 to lower the pressure therein and create a pressure differential with respect to air in the surrounding environment. This pressure differential acts on shells 126 and 248 to urge peripheral surfaces 128 and 316 against bead 216. When the press fixture 314 is retracted and hose 312 removed from check valve 256, the operator activates a switch to release the three point locking device 78, 80 and 82 and allow belts 52 and 54 to transport pallet 58 to station M shown in FIG. 15.

Figure 15:
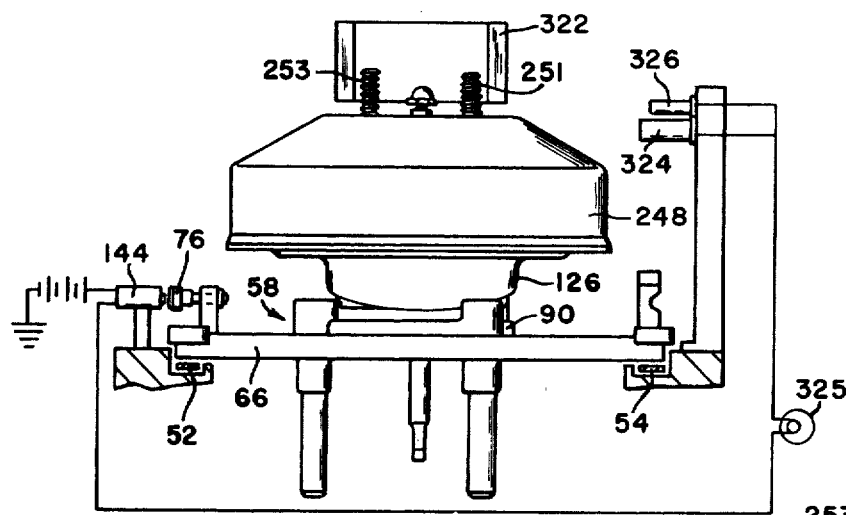
FIG. 15 is a view taken along line 15—15 of FIG. 1 illustrating the manufacturing operation at Station M.

Between stations L and N pallet 58 passes under a safety bar 322, shown in FIG. 15, since any substantial change in the pressure differential acting on shells 248 and 126 permits spring 306 to urge peripheral surface 316 out of engagement with bead 216. Such change in the pressure differential is normally caused by a nonconformity between the shells 126 and 248 such as nonconcentricity, however, a tolerance differential between the shells 126 and 248 and diaphragm bead 216 could also provide a leak path sufficient for air from the environment to enter either chamber 214 or 224 and eliminate the sealing pressure differential.

A height sensor made up of a light emitting diode 324 and a photosensitive transistor 326 are aligned with the safety bar 322. As long as the pressure differential is sustained across the shells 126 and 248, studs 251 and 253 and the shell 248 do not affect the relationship of the light beam between diode 324 and photosensitive transistor 326, as pallet 58 by passes station M. However, if the pressure differential across the shells 126 and 248 has been reduced during the time period for the pallet 58 to traverse the distance between stations L and M sufficiently for the spring to separate the shells 126 and 248, the light beam relationship between diode 324 and photosensitive transistor 326 is changed. Such a change activates a switch which operates the three point locking device 78, 80 and 82 to move base 66 out of engagement with drive belts 52 and 54. At the same time a reject signal is transmitted to pin 76 by a solenoid 144 and an indicator 325 informs an operator of the reject condition of the combination of components on the pallet 58. Thereafter, the operator removes shell 248 from the pallet 58 and places this shell 248 in a container 328 to be discarded as scrap. Thereafter, the operator activates a switch to release the three point locking device 78, 80 and 82 to allow drive belts 52 and 54 to transport pallet 58 back to station L, after passing stations A-J, where a new shell 248 is attached thereto and the seal evaluation that takes place between stations L-M again takes place.

If the change in the pressure differential across the shells 126 and 248 is not great enough for spring 306 to separate the peripheral surfaces 316 and 128 from bead 216, the height sensor is not activated and pallet 58 by passes station M.

Figure 16:
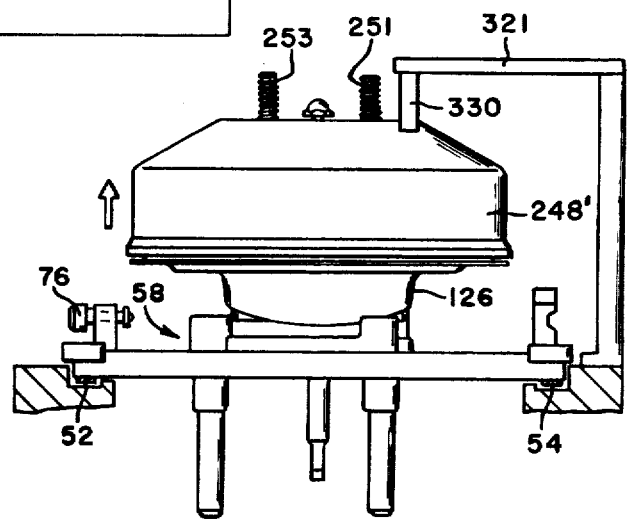
FIG. 16 is a view taken along line 16—16 of FIG. 1 illustrating the manufacturing operation at Station N.

As an added safety measure, a stop 330 as shown in FIG. 16 is attached to the end of a bar 322 at station M. If during the additional time that it takes pallet 58 to travel from station M to station N, spring 306 has overcome the pressure differential and separated the shells 126 and 248, stop 330 engages shell 248 to prevent pallet 58 from being transported to crimping station O. If a pallet 58 is stopped at station N, the operator must manually hold the pallet 58 stationary while removing shell 248' and move pin 76 to the reject position. Pallet 58 is released but bypasses stations O and P and travels on the line from A-K where pin 76 is reset and a new shell 248 is assembled to the components at station L. Thereafter the seal which is established is evaluated by the operations of stations M-N.

If the pressure differential is sufficient to hold the shells 126 and 248 together for the time period required by drive belts 52 and 54 to transport pallet 58 from station L to station M, the pallet 58 is stopped at station P where the peripheral surfaces 128 and 316 are crimped together in a manner fully disclosed in U.S. Pat. No. 3,158,930 to produce a unitary structure 370 shown in FIG. 17 in the following manner.

Figure 17:
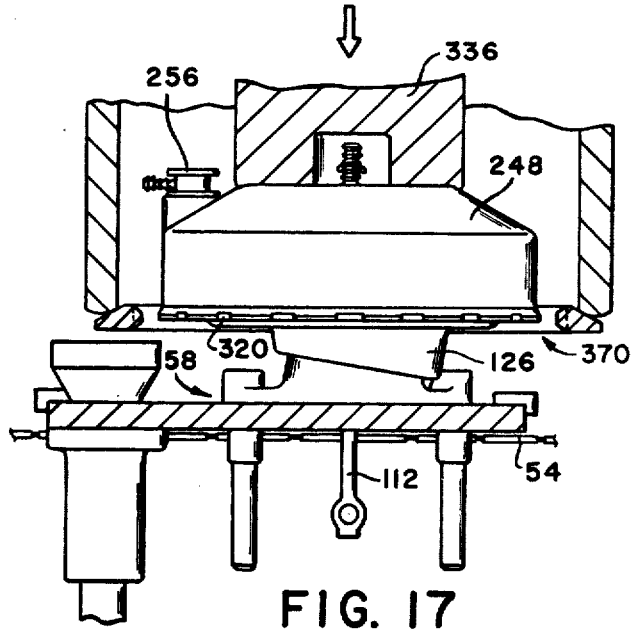
FIG. 17 is a view taken along line 17—17 of FIG. 1 illustrating the manufacturing operation at Station O.

On every pallet 58 wherein pin 76 is set in the accept position, a sensor 77 activates the three point locking device to move pallet 58 out of contact with drive belts 52 and 54 as shown in FIG. 17. A press 336 applies a predetermined force on shell 248 to impart a compressive force on bead 216. Thereafter, a lancing device crimp tabs 320 on peripheral surface 128 to lock shell 126 to shell 248. After the lancing operation, press 336 is released and a switch activated to release the three joint locking device 78, 80 and 82 and allow drive belts 52 and 54 to transport pallet 58 to station P shown in FIG. 18.

On pallets 58 . . . 58$^N$ wherein the pin 76 is in the accept position, a switch at station P senses this accept condition and bring the three point locking device 78, 80 and 82 into operation to disengage pallet 58 from drive belts 52 and 54 as shown in FIG. 18.

Figure 19:
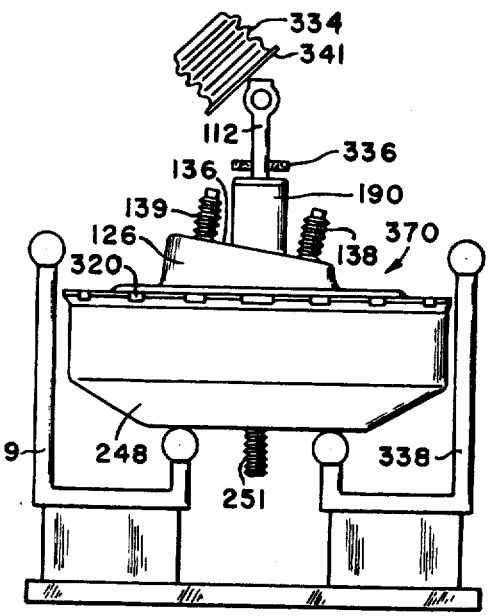
FIG. 19 is a view taken along line 19—19 of FIG. 1 illustrating the manufacturing operation at Station Q.

The operator removes the unitary structure 370 from pallet 58 at station P and places the structure 370 on conveyor guides 338 and 339 for transportation to station Q shown in FIG. 19, with the push rod 112 in an upright position.

Figure 22:
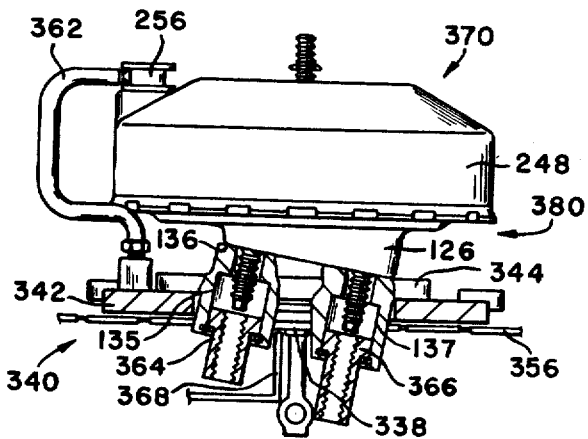
FIG. 22 is a view taken along line 22—22 of FIG. 20 illustrating a test procedure at station R.

When the unitary structure 370 arrives at station Q shown in FIG. 19, a filter 336 is placed on push rod 112. An expandable rubber boot 334 is thereafter placed on the push rod 112. Boot 334 has a lip which resiliently engages the push rod 112 and an annular radial projection 341 which engages face 136 of shell 126. The boot 334 protects surface 190 from direct exposure to any contaminents in the surrounding air that could damage the sealing surface of seal 140 shown in FIG. 5. When the boot 334 and filters 336 are installed on the push rod 112 the unitary structure 370 is placed on a pallet 340 at station R shown in FIG. 22, for evaluation in the test line shown in FIG. 20.

Figure 21:
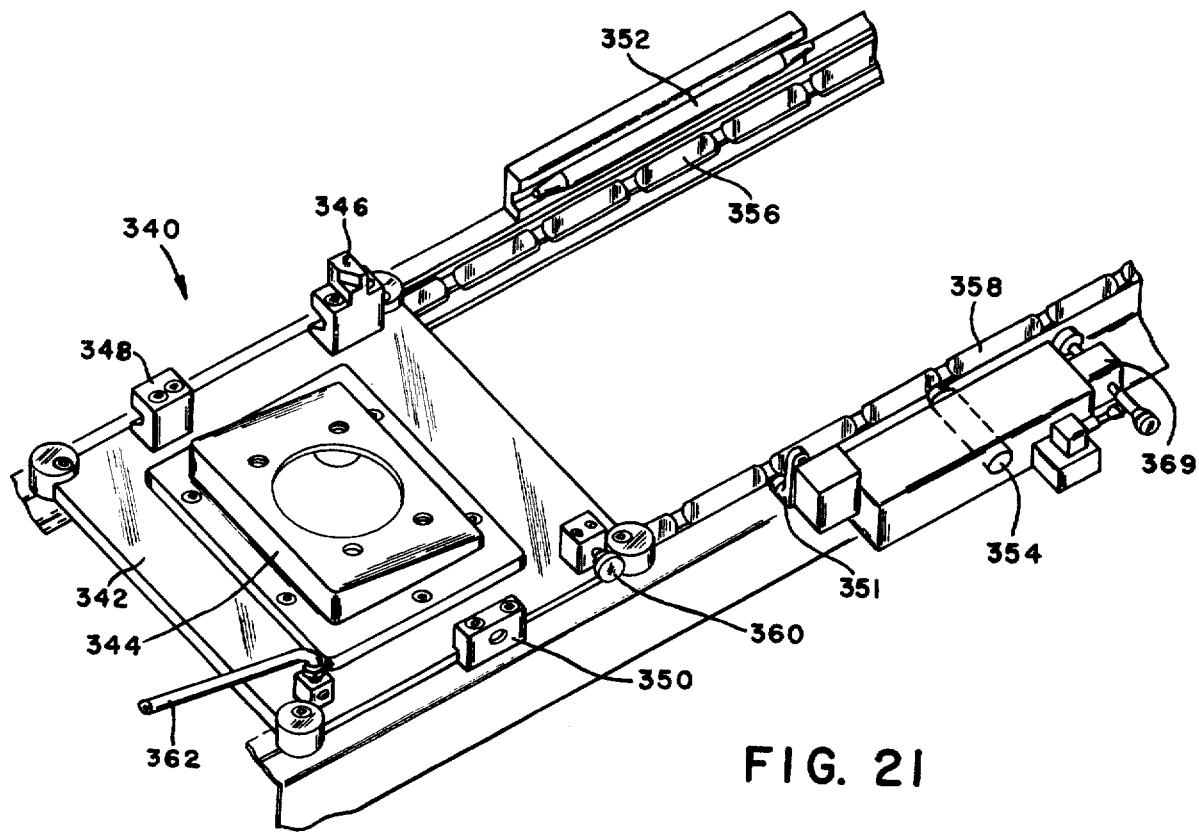
FIG. 21 is a prospective view of a pallet for transporting the unitary structure along the testing line of FIG. 20.

The pallet 340, as shown in detail in FIG. 21, has a base 342 with a fixture 344 attached thereto for positioning push rods 112 and 242 in a plane substantially perpendicular to base 342. The pallet 340 is equipped with a three point locking device, consisting of rectangular members 346, 348 and 350 which cooperate with a guide shaft 352 and lock pin 354, at each station to move base 342 off the drive belt 356 and 358 and hold the pallet 340 in a fixed position. Guide shaft 352 and locking pin 354 are connected to a lift that responds to a signal from an operational switch at each station. The operational switch is activated by a sensor 351 that senses the position of a pin 360 indicating an accept or reject condition for the unitary structure 370. Each pallet 340 has a vacuum hose 362 attached thereto which connects the check valve 256 on shell 248 with a source of vacuum at the station wherein vacuum is required for testing. The pallets 340 . . . 340$^N$ are stored on the drive belts 356 and 358 adjacent station R with the pin 360 in an accept position. When pallet 340 is brought to station R, the sensor senses the accept position of pin 360 and activates the three point locking mechanism to hold pallet 340 in a fixed position off of belts 356 and 358 as shown for station R in FIG. 22.

Figure 23:
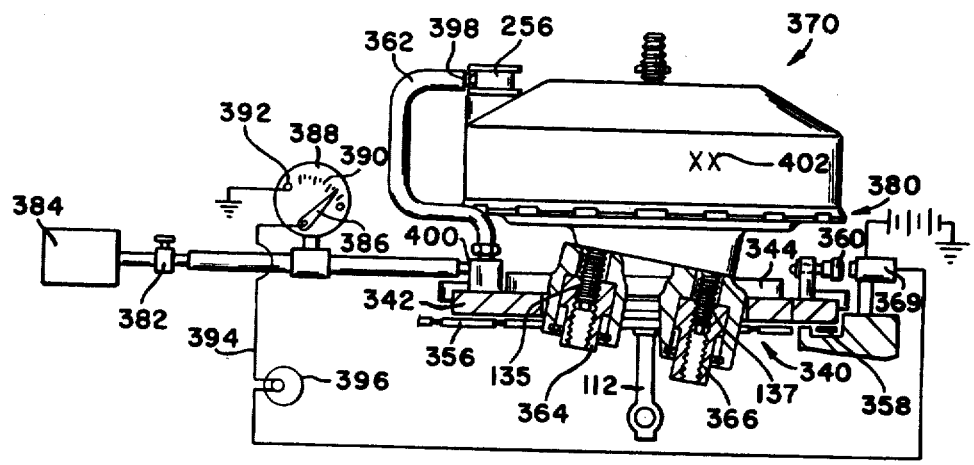
FIG. 23 is a view taken along line 23—23 of FIG. 20 illustrating a test procedure at station S.

When the unitary structure 370 is transported from station Q to station R, face 136 is placed on fixture 344. When face 136 is flush with the fixture 344, a probe 368 senses the presence of boot 334 to indicate an apparent completely assembled servomotor 370. If boot 334 is missing, a signal from probe 368 actuates an indicator to inform an operator of a defective assembly requiring the installation of the protective boot 334. Since station R is adjacent to station Q, the operator immediately installs a boot 334. Thereafter, vacuum hose 362 is attached to check valve 256 and the three point locking device released to allow drive belts 356 and 358 transport pallet 340 to station S, as shown in FIG. 23.

When the completely assembled servomotor 370 reaches station S, the operational switch 351 senses the accept position of pin 360 to operate the three point locking device 346, 348 and 350 and move base 342 of pallet 340 off the drive belts 356 and 358. When the base 342 is off belts 356 and 358, nuts 364 and 366 are attached to studs 135 and 137 to rigidly hold the servomotor 370 to pallet 340.

In order to evaluate the connection 380 created by the lancing operation at station O, a vacuum test is performed at station S to check for any leak path that may have been created in a sealing surface. The vacuum test is achieved by opening a valve 382 to allow a vacuum source 384 to evacuate air from chambers 214 and 224 through check valve 256 by way of hose 362. When a predetermined pressure level is achieved in chambers 214 and 224 as indicated by needle 386 on gage 388, valve 382 is closed. Thereafter, the pressure level is monitored by observing the position of needle 386 with respect to indicia on the dial 390. In the absence of a leak path for air from the surrounding environment, needle 386 remains substantially stationary with respect to the indicia. Should a leak path be created, air enters the chambers and changes the pressure level therein to allow needle 386 to engage contact 392 and allow electrical energy to flow through electrical circuit 394. With electrical energy flowing in circuit 394, indicator light 396 is lit to visually inform the operator that a servomotor 380 has failed to conform with set standards.

In order to confirm such a rejection, the vacuum test is repeated. However, the hose connections 398 and 400 are first observed for leaks. Thereafter, the pressure level in chambers 214 and 224 is again reduced and monitored by the action of needle 386 with respect to the indicia on dial 390. If the pressure level in the chambers 214 and 224 again changes to activate light 396, a mark 402 is placed on shell 248 to indicate the servomotor was rejected by the test at station S.

Figure 24:
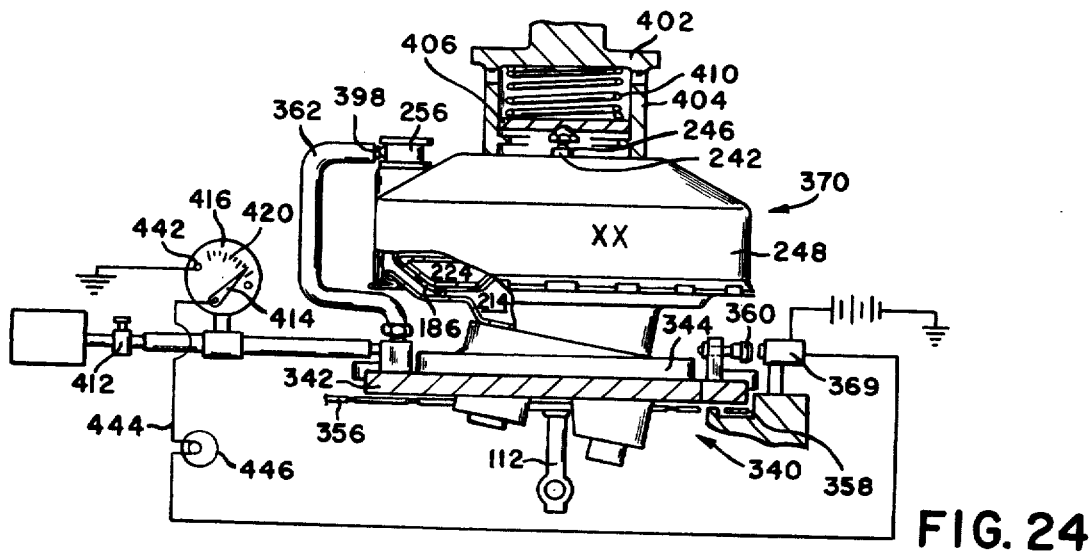
FIG. 24 is a view taken along line 24—24 of FIG. 20 illustrating a test procedure at station T.

If the re-test indicates that the initial rejection was not caused by the communication of air through a leak path in a sealing surface 380 of the servomotor, a switch releases the three point locking device and allow drive belts 356 and 358 to transport pallet 340 from station S to station T shown in FIG. 24.

However if the indicator 396 is activated a second time, solenoid 369 is activated causing plunger 367 to move pin 360 to the reject position before the release of the three point locking device.

The operational switch 351 at station T senses the position of pin 360 on pallet 340. If pin 360 in the reject position, the pallet passes through station T, however, if the pin 360 is in the accept position, the three point locking device is activated to move base 342 off drive belts 356 and 358 in a manner shown in FIG. 24.

A piston 406 which is retained in a housing 404 is brought into contact with end 246 of push rod 242 by a press 402. A spring 410 which is located in the housing 404 acts on piston 406 to simulate the operational forces required to operate a master cylinder. Thereafter, an input force is applied to push rod 112. The input force moves the poppet valve assembly 108 shown in FIG. 3 to interrupt communication through passage 102 and allow air to enter chamber 214 through passage 104. With air in chamber 214 and the residual vacuum or a lower pressure in chamber 224 resulting from the operation at station S, a pressure differential is created across diaphragm 186. This pressure differential acts on diaphragm 186 and backing plate 178 to create an operational force which moves hub 96 toward chamber 242 to provide push rod 242 with an output force.

The input force on push rod 112 is removed and valve 412 opened to evacuate air from chamber 214 and 224 as poppet valve assembly 108 returns to its rest position.

When the vacuum level in chambers 214 and 224 reach a predetermined level, as indicated by needle 414 on gage 416, the input force is again applied to push rod 112 to develop the output force in the push rod 242. This cycling process of operating the servomotor 370 is repeated for at least another cycle and the valve 412 closed. The vacuum level in chamber 214 and 224 is monitored by observing the relationship of needle 414 with respect to the indicia on dial 420 for a preset time period.

If an unacceptable lance occurred at station O, this operational cycling should cause a leak path to occur between bead 216 and peripheral surfaces 218 and 316 since the lance must be capable of withstanding the same forces as the output force carried through push rod 242. If a leak path occurs, air from the surrounding environment enters the chambers 214 and 224 to change the pressure level therein. This pressure level change is reflected by a corresponding change in the position of needle 414 with respect to the indicia on dial 420. If within a predetermined time period such a change allows needle 414 to engage contact 442, an electrical circuit 444 is closed. With electrical circuit 444 closed, electrical energy is simultaneously supplied to light 446 to provide a visual indication that servomotor 370 has been rejected and to solenoid 369 causing plunger 367 to move pin 360 to the reject position.

If the pressure level in chamber 214 and 224 remains constant, needle 414 remains stationary with respect to the indicia on dial 420. After a predetermined time period, a switch releases the three point locking device and allow drive belts 356 and 358 to transport pallet 340 from station T to station U shown in FIG. 25.

As pallet 340 approaches station U, switch 351 senses the position of pin 360 to determine if servomotor 370 has been accepted or rejected by the test performed at the preceeding stations. If the servomotor 370 has been previously rejected, the switch 351 allows pallet 340 to pass through station U. However, if the servomotor 370 has been accepted, the switch 351 activates the three point locking device which moves base 342 off drive belts 356 and 358 in a manner shown in FIG. 25.

At station U, the relationship between the end 246 of push rod 242 and face 450 on shell 248 is measured. If end 246 is within a predetermined distance of face 450, the servomotor 370 is automatically accepted. In addition, if end 246 can be adjusted to this distance by screwing threads into push rod 242, the servomotor 370 is also accepted. However, if end 246 cannot be brought to this predetermined distance, a mark 452 is applied to shell 248 to indicate the servomotor 370 has been rejected at station U as not meeting set standards. Thereafter, pin 360 is moved to the reject position and a switch releases the three point locking device to allow drive belts 356 and 358 to transport pallet 340 from station U to station V shown in FIG. 26.

As the pallet 340 approaches station V, the operational switch 351 senses the position of pin 360. If the pin 360 is in the reject position, pallet 340 passes through station V. However, if the pin 360 is in the accept position, the operational switch 351 activates the three point locking device to move base 342 of pallet 340 off drive belt 356 and 358 in a manner shown in FIG. 26.

A press 452 moves a housing 454 into engagement with face 450 on shell 248. Housing 454 has a bore 456 located therein for retaining a piston 460. A spring 462 in bore 456 acts on the piston 460 to simulate the operational characteristics of a master cylinder. A strain gage 464 connected to piston 460 creates an output signal from the movement of piston 460 corresponding to the output force and travel of the output push rod 242. The strain gage 464 is connected by lead 466 to a computer memory 468.

Similarly, a strain gage 465 associated with the input push rod 112 and actuator 470 is connected to the computer memory 468 by lead 473. The input force applied to push rod 112 and the travel of push rod 112 is transmitted to the computer memory 468. In addition the computer memory 468 is connected to a solenoid 369 by lead 472.

When pallet 340 is moved into a fixed position by the three point locking device, as shown in FIG. 26, valve 482 is opened to allow vacuum from source 480 to evacuate air from the servomotor 370 through conduits 362 and 478. The input force applied to push rod 112 operates the poppet valve 108 to create a pressure differential across diaphragm 186 and produce a corresponding force which moves hub 96 and provides push rod 242 with an output force. The input travel and force applied to push rod 112 and output force and travel of push rod 242 are recorded for various operational times and compared against a standard. If the operational characteristics of servomotor 370 do not match the standard, the servomotor 370 is rejected as not conforming to a required operational standard. When the computer memory indicates non-conformance of a servomotor, electrical energy is supplied to solenoid 369 causing plunger 367 to move pin 360 to a reject position. The operational characteristics of each servomotor 370 produced on the manufacturing line shown in FIG. 1 and tested on the test line shown in FIG. 20, are stored in the computer memory 468 to verify the operational test of the servomotor 370 at the time it was built.

On completion of the stroke-graduation test performed at station V, a switch releases the three point locking device to allow drive belts 356 and 358 to transport pallet 340 from station V to station W shown in FIG. 27.

As pallet 340 approaches station W, switch 351 senses the position of pin 360. If pin 360 is in the reject position, pallet 340 passes through station W. However, if pin 360 is in the accept position, the switch 351 supplies the three point locking device with an input to move base 342 off the drive belts 356 and 358 to a stationary position shown in FIG. 27.

When pallet 340 is locked in position at station W, valve 484 is opened to allow source 486 of vacuum to evacuate air from servomotor 370 through conduits 362 and 488.

A press 492 moves a master cylinder simulator 494 into engagement with output push rod 242 and an actuator 490 is connected to push rod 112.

Thereafter, a fixed input force is applied to push rod 112 which causes the push rod 112 to move a minimum distance. Thereafter, valve 484 is closed and the pressure level in chamber 224 monitored by gage 496. Needle 498 is sensitive to change in the pressure level in chamber 224 caused by leakage of air around valve 108 through bore 96. If the leakage of air into chamber 224 in the applied position of poppet valve 108 is greater than 0.2" in 5 seconds, needle 498 engages contact 500 to close electrical circuit 502. With circuit 502 closed, electrical energy simultaneously flows to light 504 to provide an operator with a visual indication of a rejection of the servomotor 370 and to solenoid 369 causing plunger 367 506 to move pin 360 to the reject position. If the servomotor 370 fails this applied vacuum leak test, a mark 508 is made on shell 248 to indicate this servomotor 370 has been rejected at station W for this reason. When the applied vacuum leak test is completed, the press 492 moves the master cylinder simulator 494 out of engagement with output push rod 242. Thereafter, a switch is closed to release the three point locking device and allow drive belts 356 and 358 to move pallet 340 from station W to station X shown in FIG. 28.

Figure 28:
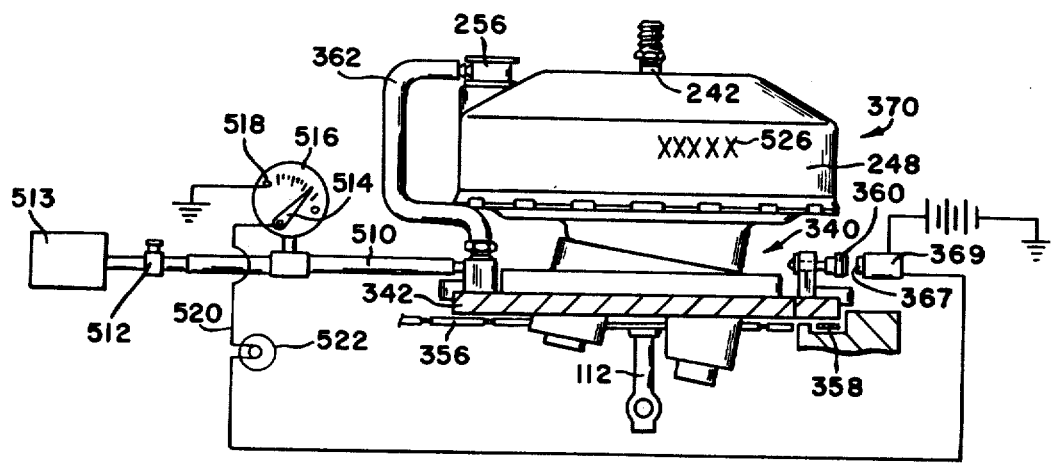
FIG. 28 is a view taken along line 28—28 of FIG. 20 illustrating a test procedure at station X.

When pallet 340 approaches station X, switch 351 senses the position of pin 360. If pin 360 is in the reject position, pallet 340 passes through station X. However, if pin 360 is in the accept position, the switch supplies the three point locking device with an input signal to move base 342 of pallet 340 off of drive belts 356 and 358 to a stationary position as shown in FIG. 28.

Conduit 510 which connects the source 513 of vacuum to servomotor 370 is automatically connected to hose 362 when pallet 340 is moved to this stationary position. Valve 512 in conduit 510 is opened to allow vacuum 513 to evacuate air from servomotor 370. When the pressure level in chambers 214 and 224 reaches a predetermined level, as indicated by needle 514 on gage 516, valve 512 is closed. If the pressure level in chambers 214 and 224 changes more than 0.4" $H_2O$ in six seconds, needle 514 engages contact 518 and closes circuit 520. With circuit 520 closed, electrical energy is simultaneously supplied to light 522 to provide the operator with a visual indication that servomotor 370 does not meet this release vacuum leak test and to solenoid 369 causing plunger 367 to move pin 360 to the reject position. Thereafter, a mark 526 is placed on shell 248 indicating that servomotor 270 has been rejected at station X for failure to meet the release vacuum leak test. After mark 526 is placed on shell 248, a switch releases the three point locking devices and allows drive belts 356 and 358 to move pallet 340 from station X to station Y shown in FIG. 29.

Figure 29:
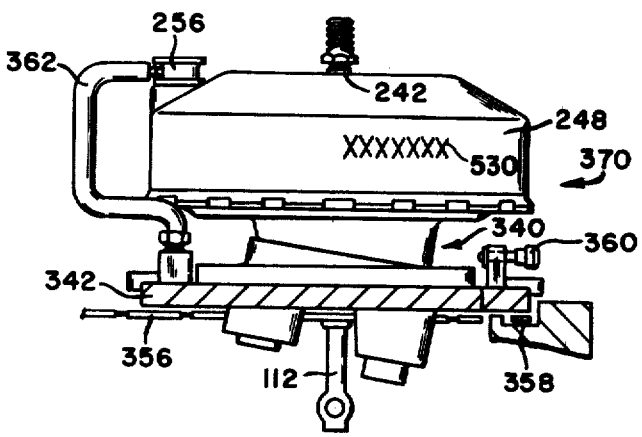
FIG. 29 is a view taken along line 29—29 of FIG. 20 illustrating a procedure of identifying an acceptable unitary sealed structure at station Y.

When pallet 340 approaches station Y, switch 351 senses the position of pin 360. If pin 360 is in the reject position, pallet 340 passes through station Y. However, if pin 360 is in the accept position, the switch 351 activates the three point locking device to move base 342 of pallet 340 off drive belts 356 and 358 in a manner as shown in FIG. 29.

Figure 30:
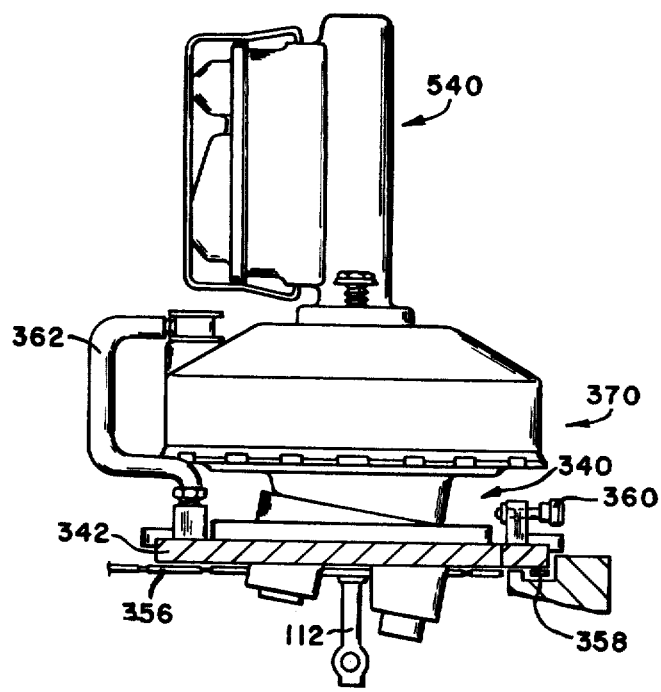
FIG. 30 is a view taken along line 30—30 of FIG. 20 illustrating the assembly of an accepted unitary structure with another member at station Z.

Thereafter, a date code and identification mark 530 is placed on shell 248 of servomotor 370. This identification mark 530 permits later retrival of information from the computer memory to 468 at station V should a need arise later to provide an indication of the operational condition of the servomotor 370 at the time it was made. After mark 530 is placed on shell 248, a switch releases the three point locking device and allows drive belts 356 and 358 to move pallet 340 from station Y to station Z shown in FIG. 30.

As pallet 340 approaches station Z, switch 351 senses the position of pin 360. If pin 360 is in the reject position, pallet 340 passes through station Z. However, if pin 360 is in the accept position, switch 351 activates the three point locking device to move base 342 of of pallet 340 off drive belts 356 and 358 to a stationary position shown in FIG. 30. With pallet 340 in this stationary position, the vacuum hose 362 is removed from check valve 256 and a master cylinder 540 of the type disclosed in U.S. Pat. No. 3,149,468 is attached to the servomotor 380.

When the master cylinder 540 is attached to the servomotor 370, the operator activates a switch to release the three point locking device and allow drive belts 356 and 358 to move pallet 340 from station Z to station Ψ shown in FIG. 31.

As pallet 340 approaches station Ψ switch 351 senses the position of pin 360. If pin 360 is in the reject position, pallet 340 passes through station Ψ. However, if pin 360 is in the accept position, switch 351 actuates the three point locking device through which base 342 is moved off of drive belts 356 and 358. Thereafter, fasteners 364 and 366 are removed from studs 135 and 137. When fasteners 364 and 366 are removed, a switch releases the three point locking device and allows drive belts 356 and 358 to move pallet 340 from station Ψ to a station $Ψ_1$ shown by point 600 in FIG. 20. As pallet 340 approaches station $Ψ_1$, switch 351 senses the position of pin 360. If pin 360 is in the reject position, pallet 340 passes through station $Ψ_1$. However, if pin 360 is in the accept position, switch 351 activates the three point locking device to move base 342 of pallet 340 off the drive belts 356 and 358. Thereafter, the master cylinder 540 and servomotor 380 are placed on a conveyor 506 shown in FIGS. 20 and 32. A gasket 542 is placed against face 136 of shell 126 and paint protectors 544 and 546 are placed on studs 135 and 137. Thereafter, the combination is passed through a paint chamber to protect the surfaces from corrosion when installed on a vehicle. After the master cylinder 540 and servomotor 380 have been removed from pallet 340, a switch is activated to release the three point locking device and allow belts 356 and 358 to move pallet 340 from station $\Psi_1$ to station $\phi$ shown in FIG. 33.

As pallet 340 approaches station $\phi$, switch 351 senses the position of pin 360. If pin 360 is in the accept position, pallet 340 is empty since the master cylinder 540 and servomotor 370 were removed at station $\Psi$ and pallet 340 passes through station $\phi$ to storage area 380 adjacent station R as shown in FIG. 20 for loading by an operator of a servomotor 370 from station Q.

However, if pin 360 is in the reject position, switch 351 activates the three point locking device to move base 342 of pallet 340 off drive belts 356 and 358 to a stationary position shown in FIG. 32. The fasteners 364 and 366 are removed from studs 135 and 137, vacuum hose 362 is removed from check valve 256 and servomotor 370 is removed from pallet 340. Thereafter, servomotor 370 is transported to an evaluation station 590 shown in FIG. 20 where the reasons for rejection are evaluated in an attmpt to reduce the possibility of repeated similar failures in the future. When servomotor 370 is removed from pallet 340, pin 360 is reset to the accept position and a switch is activated to release the locking device and allow drive belts 356 and 358 to move pallet 340 to the storage area 380 adjacent station R.

Thus, a servomotor 370 manufactured by the steps disclosed with respect to FIG. 1 and tested in the manner disclosed in FIG. 20 should operate in a manner which meets the accepted standards of the industry.

We claim:

1. A method of assembling a servomotor wherein a first shell having a first peripheral surface is located on a fixture, a diaphragm assembly is positioned on the first peripheral surface to define a first chamber between the first shell and the diaphragm assembly, a spring is connected to the diaphragm assembly, and a second shell having a second peripheral surface is placed on the spring, the improvement comprising:

applying a force for moving the second shell in opposition to the spring toward the first shell unit the diaphragm assembly is between the first and second peripheral surfaces, said diaphragm assembly and second shell defining a second chamber;

evacuating air from the first and second chambers to create a pressure differential therebetween with the surrounding environment; and removing said force from the second shell, said pressure differential acting on said first and second shells to hold the first and second peripheral surfaces against the diaphragm assembly until such time as any air may enter the first and second chambers and allow said spring to urge the second shell away from the first shell.

2. The method of assemblying a servomotor, as recited in claim 1 further including the step of:

evaluating the relationship between the first shell and the second shell after a predetermined time period to determine if the first and second peripheral surfaces are engaged with the diaphragm assembly.

3. In the method of assemblying a servomotor, as recited in claim 2, said evaluating includes the step of:

moving the first shell and the second shell connected thereto through a dimensional indicator to determine if the spring has separated the first and second shells from each other.

4. In the method of assemblying a servomotor, as recited in claim 3, further includes the step of:

removing the first and second shells from the fixture if the dimensional indicator indicates a separation of the first and second shells has occurred.

5. In the method of assemblying a servomotor as recited in claim 3 further includes the steps of:

transporting the first and second shells fom the dimensional indicator to a press; and applying a radial force to one of the first and second peripheral surfaces to create a crimp that locks the first shell to the second shell to establish a unitary structure.

6. In the method of assemblying a servomotor, as recited in claim 5, further including the steps of:

transporting the unitary structure to an operational analysis station;

allowing air to enter the first chamber and create an operational pressure differential across the diaphragm assembly with the evacuated air in the second chamber, said operational pressure differential acting on and moving said diaphragm assembly toward the second chamber to produce an operational output force after overcoming said spring;

comparing the operational output force with a reference signal to determine if the operational pressure differential has been modified through a change in the pressure level of the evacuated air caused by a leak path for air from the surrounding environment through the crimp.

7. A method of checking the sealing surfaces of components for potential leak paths during the assembly of a unitary structure comprising the steps of:

positioning a first shell on a pallet, said first shell having a first peripheral surface, a lip surrounding a first opening, and mounting members located thereon;

attaching a first seal to said shell adjacent said lip, said first seal having an interior surface and an exterior surface, said exterior surface engaging said first shell to establish a first sealing surface therebetween;

locating a projection on a first test fixture in said opening and in engagement with said interior surface of said seal to establish a second sealing surface;

moving a first test fixture into engagement with said first peripheral surface to establish a third sealing surface and a first chamber between the first test fixture and the first shell;

evacuating air from said first chamber to a predetermined pressure level;

monitoring the pressure level for a predetermined time period to determine if air from the surrounding environment has been communicated to said chamber;

removing said first test fixture from engagement with said first shell;

rejecting said first shell if the monitoring indicates air has been communicated to said chamber through one of said first, second and third sealing surfaces;

accepting said first shell if the monitoring indicates the pressure level is substantially constant during the monitoring time period;

locating a value in a bore of a hub member to position a poppet adjacent a first seat, said bore being connected to the exterior of the hub through first and second passages on opposite sides of the first seat;

positioning a backing plate against a shoulder on the hub;

locating a first bead on a diaphragm in a groove on the hub to hold the backing plate against the shoulder on the hub and establish a fourth sealing surface, said diaphragm having a second bead that surrounds the backing plate;

inserting a projection on said hub in said opening in the first shell, said projection engaging the interior surface of said first seal to establish said second sealing surface;

moving said hub member toward said first shell to bring the backing plate into engagement with the first shell while simultaneously passing air through said first passage, said bore, and said second passage, said air acting on said diaphragm to position said second bead on the first peripheral surface to establish said third sealing surface and said first chamber between the backing plate, hub member, diaphragm and first shell;

moving a second test fixture into engagement with said second bead of the diaphragm to establish a fifth sealing surface;

evacuating air from said first chamber; and monitoring the pressure level in said first chamber for a fixed time period to determine if air from the surrounding environment has entered the first chamber through a leak path in one of the first, second, third, fourth and fifth sealing surfaces.

8. The method of checking sealing surfaces, as recited in claim 7 further including the steps of:

removing said second test fixture from engagement with the second bead of the diaphragm; and rejecting said hub member, backing plate, diaphragm if the monitoring indicates a leak path for air to flow from the surrounding environment to said first chamber.

9. The method of checking sealing surfaces, as recited in claim 8 further including the steps of:

accepting said first shell, hub member, backing plate, and diaphragm if the pressure level in the first chamber remains substantially constant during this fixed monitoring time period at the second test fixture.

10. The method of checking sealing surfaces, as recited in claim 9 further including the steps of:

inserting a grommet in a second opening in a second shell;

inserting a check valve in said grommet, said grommet engaging said second shell to establish a sixth sealing surface and said check valve to establish a seventh sealing surface;

positioning said second shell on a third test fixture to establish a second chamber between the test fixture and the second shell;

evacuating air from said second chamber; and monitoring the pressure level in said second chamber for a test time period to determine if air from the surrounding environment is communicated thereto through a leak path in the sixth and seventh sealing surfaces.

11. The method of checking sealing surfaces, as recited in claim 10 further including the steps of:

removing said second shell from the third test fixture; and rejecting said second shell if the pressure level in said second chamber indicates a leak path for air.

12. The method of checking sealing surfaces, as recited in claim 11 further including the steps of:

accepting said second shell and check valve if the pressure level in said second chamber remains substantially uniform during the monitoring test time period.

13. The method of checking sealing surfaces as recited in claim 12 further including the steps of:

attaching an output push rod to said hub member;

surrounding said output push rod with a spring;

positioning said second shell on said spring;

moving said second shell toward said first shell by a compressive force that overcomes said spring, said output push rod passing through said second shell to establish an eighth sealing surface therebetween, said second shell having a second peripheral surface that engages said diaphragm to establish said fifth sealing surface and thereafter create said second chamber between the second shell, the hub member, the diaphragm, backing plate and the output push rod;

evacuating air from the first and second chambers to create a pressure differential between air in the surrounding environment and the air in the first and second chambers;

removing said compressive force from said second shell, said pressure differential acting on said first and second shells and in opposition to said spring urging said first and second peripheral surfaces into engagement with said diaphragm to maintain said third and fifth sealing surfaces;

monitoring the pressure level in said first and second chambers for an inspection time period to determine if any air from the surrounding environment has entered the first and second chambers by a leak path through the first, second, third, fourth, fifth, sixth, seventh and eighth sealing surfaces and changed the pressure differential therein.

14. The method of checking sealing surfaces, as recited in claim 13 further including:

inspecting the relationship between the first and second shells to determine any change has occurred in said pressure differential sufficient for said spring to move said second shell away from said first shell; and rejecting the combination of said first shell and second shell if said second shell is separated from said first shell.

15. The method of checking sealing surfaces as recited in claim 14 further including the steps of:

accepting said first shell and second shell if the inspection indicates the pressure differential has remained substantially constant during the inspection time period; and crimping one of the first and second peripheral surfaces with respect to the other to affix the first and second shells together and thereby establish a unitary structure.

16. The method of checking sealing surfaces as recited in claim 15 further including the steps of:

attaching said unitary structure to a second pallet;

moving said valve in said bore to interrupt communication between said first and second chambers through said first passage while allowing air to flow into said first chamber through said second passage to create an operational pressure differential between the first and second chambers, said operational pressure differential acting on said diaphragm and backing plate to develop an output force that is transmitted through said hub member into the output push rod, said output force acting on said crimp and attempting to separate said third and fifth sealing surfaces; and comparing the input force applied to move said valve and the output force resulting therefrom with a reference to determine if any changes occur in the operational pressure differential during an evaluation period through the communication of air through a leak path in the third and fifth sealing surfaces.

17. The method of checking sealing surfaces, as recited in claim 16 further including the steps of:
rejecting the integral structure if the pressure differential changes during the evaluation time period.

18. The method of checking sealing surfaces, as recited in claim 16, further including the steps of:
removing the input force applied on said valve; and
measuring the time required to evacuate the first and second chambers to a predetermined pressure level with a reference to determine if a leak path has developed in any sealing surface during the development of the operational output force.

19. The method of checking sealing surfaces as recited in claim 18 further including the steps of:
accepting the unitary structure as a sealed container; and
identifying the unitary structure as having passed the qualification testing for the sealing surfaces contained therein.

* * * * *